US010971194B2

(12) United States Patent
Miranda Gavillan et al.

(10) Patent No.: US 10,971,194 B2
(45) Date of Patent: *Apr. 6, 2021

(54) DATA STORAGE LIBRARY WITH MEDIA ACCLIMATION DEVICE AND METHODS OF ACCLIMATING DATA STORAGE MEDIA

(71) Applicant: International Business Machines Corporation, Armonk, NY (US)

(72) Inventors: Jose G. Miranda Gavillan, Tucson, AZ (US); Brian G. Goodman, Tucson, AZ (US); Kenny Nian Gan Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,340

(22) Filed: Jul. 2, 2019

(65) Prior Publication Data
US 2019/0325918 A1   Oct. 24, 2019

Related U.S. Application Data

(63) Continuation of application No. 15/460,379, filed on Mar. 16, 2017, now Pat. No. 10,395,695.

(51) Int. Cl.
*G11B 15/68* (2006.01)
*G11B 33/14* (2006.01)

(52) U.S. Cl.
CPC .......... *G11B 33/142* (2013.01); *G11B 15/68* (2013.01); *G11B 15/6885* (2013.01)

(58) Field of Classification Search
CPC .................... G06F 3/0686; G06F 12/00–16
See application file for complete search history.

(56) References Cited

U.S. PATENT DOCUMENTS 4,831,476 A    5/1989  Branc et al.
4,838,911 A    6/1989  Robertson et al.
(Continued)

FOREIGN PATENT DOCUMENTS

CN    102192631 A    9/2011
CN    102407663 A    4/2012
(Continued)

OTHER PUBLICATIONS

List Of IBM Patents or Patent Applications Treated As Related, dated Jul. 2, 2019, 2 pages.
(Continued)

*Primary Examiner* — Nicholas J Simonetti
(74) *Attorney, Agent, or Firm* — Scully, Scott, Murphy & Presser, P.C.

(57) ABSTRACT

A system, method and apparatus to acclimate a data storage component from a first environmental setting to a second environmental setting is disclosed. In one embodiment a system having a data storage library with a plurality of data storage cartridges and at least one media acclimation device having one or more storage locations which are sized to accept one or more data storage cartridges therein is disclosed. The at least one media acclimation device is configured to gradually acclimate the one or more storage locations from an external environmental condition to an internal environmental condition. In another embodiment, a method of acclimating a data storage library component is disclosed. The system, method and apparatus may optionally further include at least one environmental conditioning unit for conditioning the internal environment within the library.

19 Claims, 21 Drawing Sheets

(56) References Cited

U.S. PATENT DOCUMENTS

| | | | |
|---|---|---|---|
| 5,278,708 A | 1/1994 | Apple et al. | |
| 5,449,229 A | 9/1995 | Aschenbrenner et al. | |
| 5,940,354 A | 8/1999 | Inoue | |
| 6,347,020 B1 | 2/2002 | Carpenter et al. | |
| 6,366,982 B1 | 4/2002 | Suzuki et al. | |
| 6,409,450 B1 | 6/2002 | Ostwald et al. | |
| 6,457,928 B1 | 10/2002 | Ryan | |
| 6,467,285 B2 | 10/2002 | Felder et al. | |
| 6,478,524 B1 | 11/2002 | Malin | |
| 6,494,663 B2 | 12/2002 | Ostwald et al. | |
| 6,537,013 B2 | 3/2003 | Emberty et al. | |
| 6,563,771 B1 | 5/2003 | Debiez | |
| 6,661,596 B2 | 12/2003 | Chliwnyj et al. | |
| 6,676,026 B1 | 1/2004 | McKinley et al. | |
| 6,676,505 B2 | 1/2004 | Behl | |
| 6,854,275 B2 | 2/2005 | Evans | |
| 6,896,612 B1 | 5/2005 | Novotny | |
| 6,924,981 B2 | 8/2005 | Chu et al. | |
| 6,940,716 B1 | 9/2005 | Korinsky et al. | |
| 7,039,924 B2 | 5/2006 | Goodman et al. | |
| 7,106,538 B2 | 9/2006 | Minemura et al. | |
| 7,277,247 B2 | 10/2007 | Hoshino | |
| 7,434,412 B1 | 10/2008 | Miyahira | |
| 7,474,497 B2 | 1/2009 | Jesionowski et al. | |
| 7,635,246 B2 | 12/2009 | Neeper et al. | |
| 7,656,602 B2 | 2/2010 | Iben et al. | |
| 7,656,660 B2 | 2/2010 | Hoeft et al. | |
| 7,746,634 B2 | 6/2010 | Hom et al. | |
| 7,751,188 B1 | 7/2010 | French et al. | |
| 7,961,419 B2 | 6/2011 | Suzuki et al. | |
| 8,051,671 B2 | 11/2011 | Vinson et al. | |
| 8,141,621 B2 | 3/2012 | Campbell et al. | |
| 8,151,046 B2 | 4/2012 | Suzuki et al. | |
| 8,154,870 B1 | 4/2012 | Czamara et al. | |
| 8,206,976 B2 | 6/2012 | Kobayashi et al. | |
| 8,209,993 B2 | 7/2012 | Carlson et al. | |
| 8,210,914 B2 | 7/2012 | McMahan et al. | |
| 8,514,513 B2 | 8/2013 | Hori | |
| 8,544,289 B2 | 10/2013 | Johnson et al. | |
| 8,675,303 B2 | 3/2014 | Compton et al. | |
| 8,694,152 B2 | 4/2014 | Cyrulik et al. | |
| 8,789,384 B2 | 7/2014 | Eckberg et al. | |
| 8,849,784 B2 | 9/2014 | Alber et al. | |
| 8,857,208 B2 | 10/2014 | Malin | |
| 8,939,524 B1 | 1/2015 | Gasser | |
| 8,974,274 B2 | 3/2015 | Carlson | |
| 9,025,275 B1 | 5/2015 | Manes et al. | |
| 9,043,035 B2 | 5/2015 | Chainer et al. | |
| 9,069,534 B2 | 6/2015 | Rogers | |
| 9,110,641 B2 | 8/2015 | Wu | |
| 9,155,230 B2 | 10/2015 | Eriksen | |
| 9,190,112 B1 | 11/2015 | Bayang et al. | |
| 9,240,209 B1 | 1/2016 | Crawford et al. | |
| 9,255,936 B2 | 2/2016 | Hunt et al. | |
| 9,291,408 B2 | 3/2016 | Iyengar et al. | |
| 9,321,136 B2 | 4/2016 | Eckberg et al. | |
| 9,361,921 B2 | 6/2016 | Herget | |
| 9,368,148 B2 | 6/2016 | Starr et al. | |
| 9,433,122 B2 | 8/2016 | Ohba et al. | |
| 9,642,286 B1 | 5/2017 | Gutierrez et al. | |
| 9,888,615 B1 | 2/2018 | Frink et al. | |
| 9,916,869 B1 | 3/2018 | Miranda Gavillan et al. | |
| 9,916,871 B1 | 3/2018 | Miranda Gavillan et al. | |
| 9,940,976 B1 | 4/2018 | Gale et al. | |
| 9,949,410 B1 | 4/2018 | Kowalski et al. | |
| 10,004,165 B1 | 6/2018 | Bailey et al. | |
| 10,026,445 B1 | 7/2018 | Gale et al. | |
| 10,026,455 B1 | 7/2018 | Miranda Gavillan et al. | |
| 10,045,457 B1 | 8/2018 | Miranda Gavillan et al. | |
| 10,303,376 B2 | 5/2019 | Miranda Gavillan et al. | |
| 10,395,695 B2 | 8/2019 | Miranda Gavillan et al. | |
| 10,417,851 B2 | 9/2019 | Gale et al. | |
| 10,418,071 B2 | 9/2019 | Gale et al. | |
| 10,431,254 B2 | 10/2019 | Miranda Gavillan et al. | |
| 2002/0023444 A1* | 2/2002 | Felder | F25D 29/001 |
| | | | 62/177 |
| 2002/0098064 A1 | 7/2002 | Ostwald et al. | |
| 2003/0039056 A1 | 2/2003 | Satoh | |
| 2003/0197619 A1 | 10/2003 | Lawrence et al. | |
| 2004/0025515 A1* | 2/2004 | Evans | G11B 33/142 |
| | | | 62/3.2 |
| 2004/0080244 A1 | 4/2004 | Lowther, Jr. et al. | |
| 2004/0145468 A1 | 7/2004 | La et al. | |
| 2004/0153386 A1 | 8/2004 | Eckerdt | |
| 2004/0165358 A1 | 8/2004 | Regimbal et al. | |
| 2004/0264042 A1 | 12/2004 | Pollard et al. | |
| 2005/0057847 A1 | 3/2005 | Armagost et al. | |
| 2005/0170770 A1 | 8/2005 | Johnson et al. | |
| 2005/0185323 A1 | 8/2005 | Brace et al. | |
| 2005/0270727 A1 | 12/2005 | Shih | |
| 2006/0177922 A1 | 8/2006 | Shamah et al. | |
| 2006/0250578 A1 | 11/2006 | Pohl et al. | |
| 2006/0259195 A1 | 11/2006 | Eliuk et al. | |
| 2006/0262447 A1 | 11/2006 | Hoshino | |
| 2007/0180278 A1* | 8/2007 | Botchek | G06F 1/266 |
| | | | 713/300 |
| 2007/0250410 A1 | 10/2007 | Brignone et al. | |
| 2008/0043371 A1 | 2/2008 | Konshak et al. | |
| 2008/0094797 A1 | 4/2008 | Coglitore et al. | |
| 2008/0106368 A1 | 5/2008 | Vitier | |
| 2008/0151491 A1 | 6/2008 | Baldwin et al. | |
| 2008/0231152 A1* | 9/2008 | Malin | A47B 63/06 |
| | | | 312/305 |
| 2009/0046427 A1 | 2/2009 | Noteboom et al. | |
| 2009/0061758 A1 | 3/2009 | Yeung et al. | |
| 2009/0168345 A1 | 7/2009 | Martini | |
| 2009/0266511 A1 | 10/2009 | Yang | |
| 2010/0078492 A1 | 4/2010 | Cislo | |
| 2010/0170277 A1* | 7/2010 | Schmitt | H05K 7/1497 |
| | | | 62/259.2 |
| 2010/0188810 A1 | 7/2010 | Andersen et al. | |
| 2010/0254241 A1 | 10/2010 | Aoki | |
| 2010/0311317 A1 | 12/2010 | Mcreynolds et al. | |
| 2011/0022771 A1 | 1/2011 | Foerster | |
| 2011/0083824 A1 | 4/2011 | Rogers | |
| 2011/0108207 A1 | 5/2011 | Mainers et al. | |
| 2011/0231007 A1 | 9/2011 | Biehle et al. | |
| 2012/0046792 A1 | 2/2012 | Secor | |
| 2012/0155027 A1 | 6/2012 | Broome et al. | |
| 2012/0305042 A1 | 12/2012 | Lorbiecki | |
| 2013/0031928 A1 | 2/2013 | Kim | |
| 2013/0088833 A1 | 4/2013 | Cox et al. | |
| 2013/0128455 A1 | 5/2013 | Koblenz et al. | |
| 2013/0244563 A1 | 9/2013 | Noteboom et al. | |
| 2014/0019768 A1 | 1/2014 | Pineau et al. | |
| 2014/0059946 A1 | 3/2014 | Gardner et al. | |
| 2014/0206271 A1 | 7/2014 | Ignacio | |
| 2014/0238639 A1 | 8/2014 | Ambriz et al. | |
| 2014/0277765 A1 | 9/2014 | Karimi et al. | |
| 2014/0290162 A1 | 10/2014 | Tanimoto | |
| 2014/0293471 A1 | 10/2014 | Sakuma | |
| 2015/0036293 A1 | 2/2015 | Martini | |
| 2015/0086305 A1 | 3/2015 | Ostwald et al. | |
| 2015/0088319 A1 | 3/2015 | Dasari et al. | |
| 2015/0167996 A1 | 6/2015 | Fadell et al. | |
| 2015/0179210 A1 | 6/2015 | Ostwald et al. | |
| 2015/0203297 A1 | 7/2015 | Manning et al. | |
| 2015/0208554 A1 | 7/2015 | Leigh et al. | |
| 2015/0269641 A1 | 9/2015 | Roy | |
| 2015/0294525 A1 | 10/2015 | Broom et al. | |
| 2016/0094898 A1 | 3/2016 | Primm et al. | |
| 2016/0107312 A1 | 4/2016 | Morrill et al. | |
| 2016/0109389 A1 | 4/2016 | Suzuki et al. | |
| 2016/0112245 A1 | 4/2016 | Mankovskii | |
| 2016/0117126 A1 | 4/2016 | De Spiegeleer et al. | |
| 2016/0223455 A1 | 8/2016 | Minegishi | |
| 2016/0240061 A1 | 8/2016 | Li et al. | |
| 2016/0302332 A1 | 10/2016 | Anderson et al. | |
| 2017/0010015 A1 | 1/2017 | Jan | |
| 2017/0064876 A1 | 3/2017 | Leckelt et al. | |
| 2017/0154483 A1 | 6/2017 | Cordiner et al. | |
| 2017/0275012 A1 | 9/2017 | Tretow et al. | |
| 2017/0323666 A1 | 11/2017 | Jesionowski et al. | |

(56) References Cited

U.S. PATENT DOCUMENTS

| | | |
|---|---|---|
| 2017/0347496 A1 | 11/2017 | Smith |
| 2018/0077819 A1 | 3/2018 | Roy |
| 2018/0155975 A1 | 6/2018 | Kempfle |
| 2018/0172304 A1 | 6/2018 | Wolfson |
| 2018/0184548 A1 | 6/2018 | Frink et al. |
| 2018/0267581 A1 | 9/2018 | Miranda Gavillan et al. |
| 2018/0267718 A1 | 9/2018 | Gale et al. |
| 2018/0268860 A1 | 9/2018 | Miranda Gavillan et al. |
| 2018/0268861 A1 | 9/2018 | Miranda Gavillan et al. |
| 2018/0268873 A1 | 9/2018 | Miranda Gavillan et al. |

FOREIGN PATENT DOCUMENTS

| | | |
|---|---|---|
| CN | 102881313 A | 1/2013 |
| CN | 204361533 U | 5/2015 |
| JP | 11-287499 | 10/1999 |
| JP | 2001093121 A | 4/2001 |
| JP | 2001307474 A | 11/2001 |
| JP | 2009087518 A | 4/2009 |
| JP | 2011191207 A | 9/2011 |
| WO | 2007099542 A2 | 9/2007 |
| WO | 2008014578 A1 | 2/2008 |
| WO | 2009134610 A2 | 11/2009 |
| WO | WO2009134610 A2 | 11/2009 |
| WO | 2010067443 A1 | 6/2010 |

OTHER PUBLICATIONS

Office Action dated Oct. 22, 2019 received in U.S. Appl. No. 15/460,429.

Office Action dated Feb. 14, 2020 received in U.S. Appl. No. 15/460,429, 8 pages total.

Hanaoka et al., "Technologies for Realizing New ETERNUS LT270 High-End Tape Library System", FUJITSU Sci. Tech. J., 42.1, pp. 24-31, Jan. 2006.

McCormick-Goodhart et al., "The Design and Operation of a Passive Humidity-Controlled Cold Storage Vault Using Convnetional Freezer Technology and Moisture-Sealed Cabinets", IS&T's 2004 Archiving Conference, Apr. 20-23, 2005, San Antonio, Texas.

Frachtenberg et al., "Thermal Design in the Open Compute Datacenter", Thermal and Thermomechanical Phenomena in Electronic Systems (ITherm), 13th IEEE 122012.

Oga et al., "Indirect External Air Cooling Type Energy-Saving Hybrid Air Conditioner for Data Centers, "F-COOL NEO"", FUJI ELECTIC Review, vol. 60, No. 1, Mar. 30, 2014, pp. 59-64.

Lee et al., "Thermoelectric-based Sustainable Self-Cooling for Fine-Grained Processor Hot Spots", 15th IEEE ITHERM Conference, May 31-Jun. 3, 2016, pp. 847-856.

Anonymous, "Method for a Direct Air Fee Cooling with a real time hygrometry regulation for Data Center", IP.COM, IPCOM000200312D, Oct. 5, 2010, pp. 1-3.

Ouchi et al., "Thermal Management Systems for Data Centers with Liquid Cooling Technique of CPU"<ITherm IEEE 13th Intersociety Conference, May 30-Jun. 1, 2012, pp. 790-798.

IBM, "Energy Efficient Cooling System for Data Center", IPCOM000182040D, Apr. 23, 2009, pp. 1-4.

Rasmussen, "Cooling Options for Rack Equipment with Side-to-Side Airflow", www.apc.com, 2004.

Office Action dated Month Aug. 5, 2020 received in U.S. Appl. No. 16/557,099, 47 pages.

Office Action dated Jan. 29, 2021 received in U.S. Appl. No. 16/557,099, 24 pages.

* cited by examiner

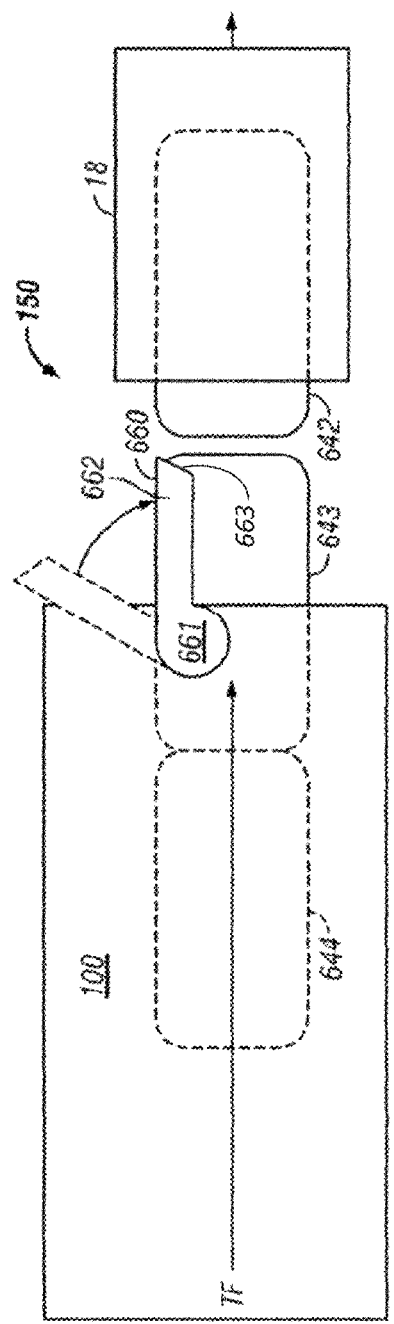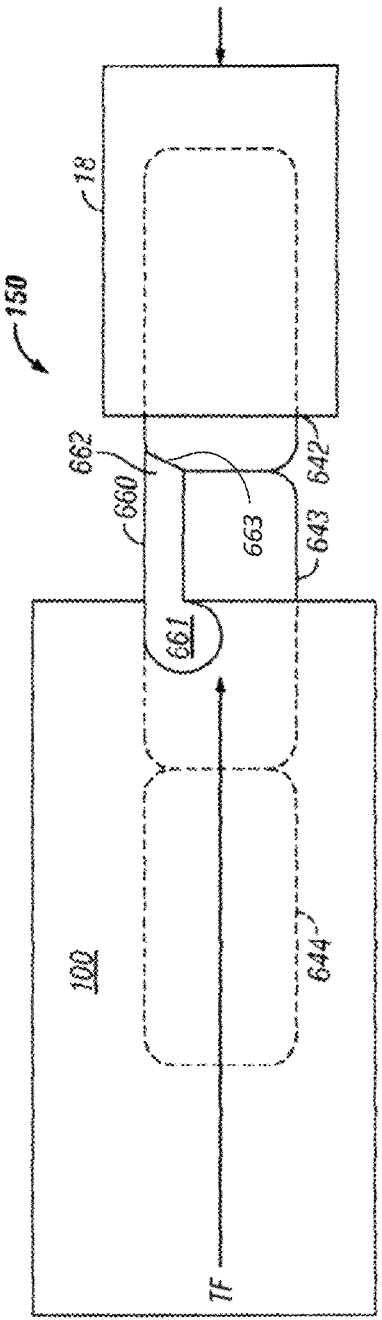

DATA STORAGE LIBRARY WITH MEDIA ACCLIMATION DEVICE AND METHODS OF ACCLIMATING DATA STORAGE MEDIA

BACKGROUND

The present disclosure relates to a library for the storage and transfer of data, and more specifically, to a self-cooled data storage library having a media acclimation device for gradually acclimating data storage cartridges and/or media.

Automated data storage libraries are known for providing cost effective storage and retrieval of large quantities of data. The data in automated data storage libraries is typically stored on the media contained in data storage cartridges that are, in turn, stored at storage slots or locations and the like inside the library in a fashion that renders the media, and its resident data, accessible for physical retrieval. Such data storage cartridges, are also commonly referred to as "removable media." The media in data storage cartridges also referred to as data storage cartridge media or data storage media may comprise any type of media on which data may be stored, and which optionally may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

Efforts to improve the performance of traditional data storage centers attempt to minimize the cost of processing and storing data. One option that is employed to reduce operational costs of data centers is to run the equipment in the data center at the high end of its environmental operational limits, thereby reducing cooling requirements and operational costs of the data center. In other words, data centers are running increasingly hot and more humid conditions than traditional data centers in an attempt to reduce operating costs. Magnetic tape may be susceptible to degradation when exposed to these unfavorable conditions, and therefore, this option may have negative implications for magnetic tape libraries.

In an effort to control the environment within data storage libraries so as to provide improved working conditions for data storage media, data storage drives, etc., particularly magnetic tape media and drives, environmental conditioning units may be associated with and/or incorporated into the data storage libraries themselves to control the temperature, humidity and/or other environmental conditions within the interior of the data storage library. While these environmental conditioning units may effectively control the temperature, humidity and/or other conditions within the data storage libraries, the environmental conditions of the area surrounding the libraries remain largely unchanged, with conditions often being higher in both temperature and humidity. While this may allow a data center to operate at reduced costs, it may also result in a marked temperature differential between the interior and exterior environments of the data storage libraries with environmental conditioning units. Such a temperature differential may prove problematic during service of the data storage library and/or replacement of data storage library components such as data storage cartridges, data storage drives, etc., as condensation may develop on replacement cartridges and other service parts during installation and/or removal from the data storage library. Condensation formation and accumulation on such sensitive componentry, including particularly magnetic tape media, cartridges and drives, may cause degraded performance and in worst case scenarios, component failure and/or data loss.

SUMMARY

According to an embodiment, a data storage library for the handling and storage of a plurality of data storage cartridges is disclosed. The data storage library comprises at least one library frame enclosure, the at least one library frame enclosure configured to receive one or more data storage cartridges, and at least one environmental conditioning unit for conditioning the internal environment conditions within the interior of the at least one library frame enclosure to be different than the environmental conditions exterior of the at least one library frame enclosure. The data storage library further includes at least one media acclimation device comprising one or more storage locations to receive the one or more data storage cartridges therein, and further wherein the at least one media acclimation device is configured to gradually acclimate the one or more storage locations from one or more external environmental conditions to one or more internal environmental conditions.

The at least one media acclimation device of the data storage library may further comprise at least one of a thermoelectric heater, a thermoelectric cooler, an electric heater, a liquid heater, a liquid cooler, an air conditioner, a heat pump, an evaporative cooler, an ionizer, a humidifier, a dehumidifier, one or more fans, or any combination thereof.

The data storage library may comprise one or more import/export (I/O) stations, wherein at least a portion of the one or more I/O stations is configured to act as the at least one media acclimation device. The one or more I/O stations may also comprise at least a first door on a front surface thereof and at least a second door on a rear surface thereof, wherein the first and second doors are configured to selectively provide an isolated environment within the one or more I/O stations. In another aspect of the embodiment, the first door on the front surface of the one or more I/O stations is manually operable by a user for insertion of the at least one data storage cartridge. In yet another aspect of the embodiment, the one or more I/O stations may comprise one of more fans, wherein the one or more fans are configured to selectively provide airflow from at least one of the interior environment of the library frame enclosures and the exterior environment of the library frame enclosures.

In accordance with another aspect of the embodiment, the data storage library may comprise one or more data storage drive bays, wherein the at least one media acclimation device is configured to fit into the one or more data storage drive bays. The at least one media acclimation device may comprise at least one opening configured to provide access for insertion and removal of at least one data storage cartridge therein. Furthermore, the at least one media acclimation device may comprise at least one air duct in communication with an internal cavity of the at least one media acclimation device. Alternatively, the at least one media acclimation device may comprise at least one liquid supply line in communication with an internal cavity of the at least one media acclimation device. The data storage library may also have a robotic accessor for accessing and transporting one or more data storage cartridges, wherein the at least one media acclimation device is incorporated into the robotic accessor.

According to another embodiment of the present disclosure, a method of acclimating a component for insertion into or removal from a data storage library is disclosed. The method may comprise inserting at least one data storage cartridge into the at least one media acclimation device in response to at least one environmental condition within the at least one media acclimation device being at or near the at least one environmental condition outside of the data storage library. The method may further include adjusting at least one environmental condition within the at least one media acclimation device based upon at least one monitored environmental condition at the interior of the data storage library and the at least one monitored environmental condition within the at least one media acclimation device. Additionally, the method may comprise determining if the at least one environmental condition within the at least one media acclimation device meets a predetermined threshold, and removing the data storage cartridge from the at least one media acclimation device when it is determined that the at least one condition within the at least one media acclimation device meets the predetermined threshold.

The at least one environmental condition detected at the interior of the data storage library, at the exterior of the library, and within the media acclimation device may be at least one of the temperature level and the humidity level. Furthermore, the data storage cartridge may be manually inserted into the media acclimation device by a user or, alternatively, the data storage cartridge may be inserted into the media acclimation device by a robotic accessor within the data storage library. The at least one environmental condition at the interior and exterior of the data storage library and the at least one environmental condition within the media acclimation device may each be determined by at least one of a temperature sensor and a humidity sensor.

In accordance with another embodiment, a computer-implemented method is disclosed, the computer implemented method comprising monitoring at least one environmental condition within a media acclimation device associated with the data storage library, and monitoring at least one environmental condition outside the media acclimation device. The computer-implemented method further includes adjusting the at least one environmental condition within the media acclimation device based on the at least one environmental condition outside the media acclimation device, and determining if the at least one environmental condition within the media acclimation device meets a predetermined threshold.

BRIEF DESCRIPTION OF THE DRAWINGS

FIG. 7A shows the housing in phantom lines to show the interior of the deep slot cell.

FIGS. 8A-8D are partial side views of one embodiment of a cartridge blocking mechanism.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1A:
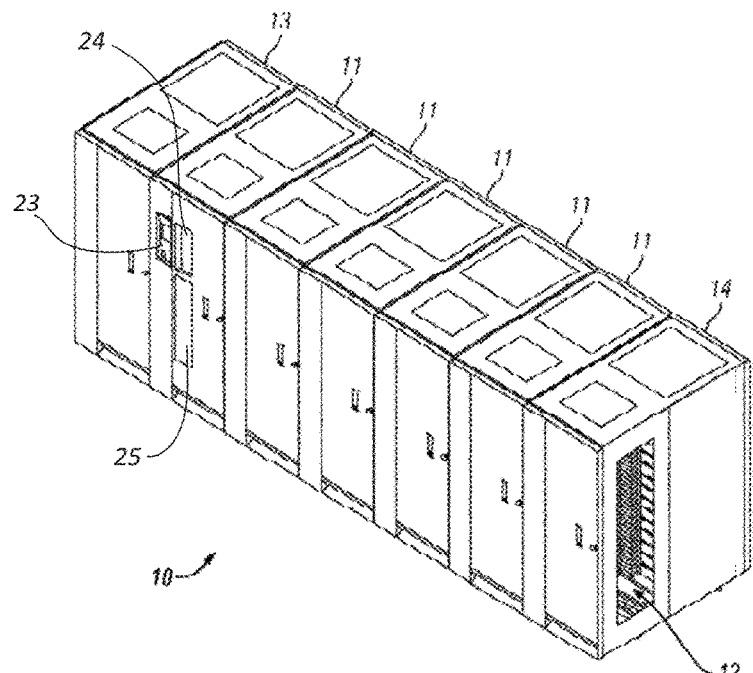
FIG. 1A is a perspective view of one embodiment of an automated data storage library.
Figure 1B:
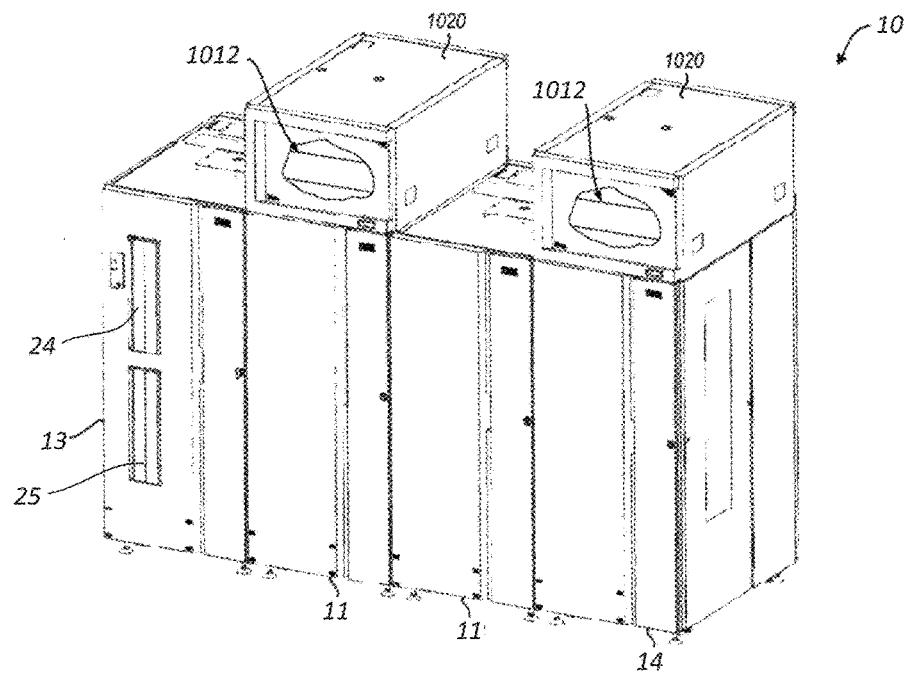
FIG. 1B is a perspective view of another embodiment of an automated data storage library.
Figure 2:
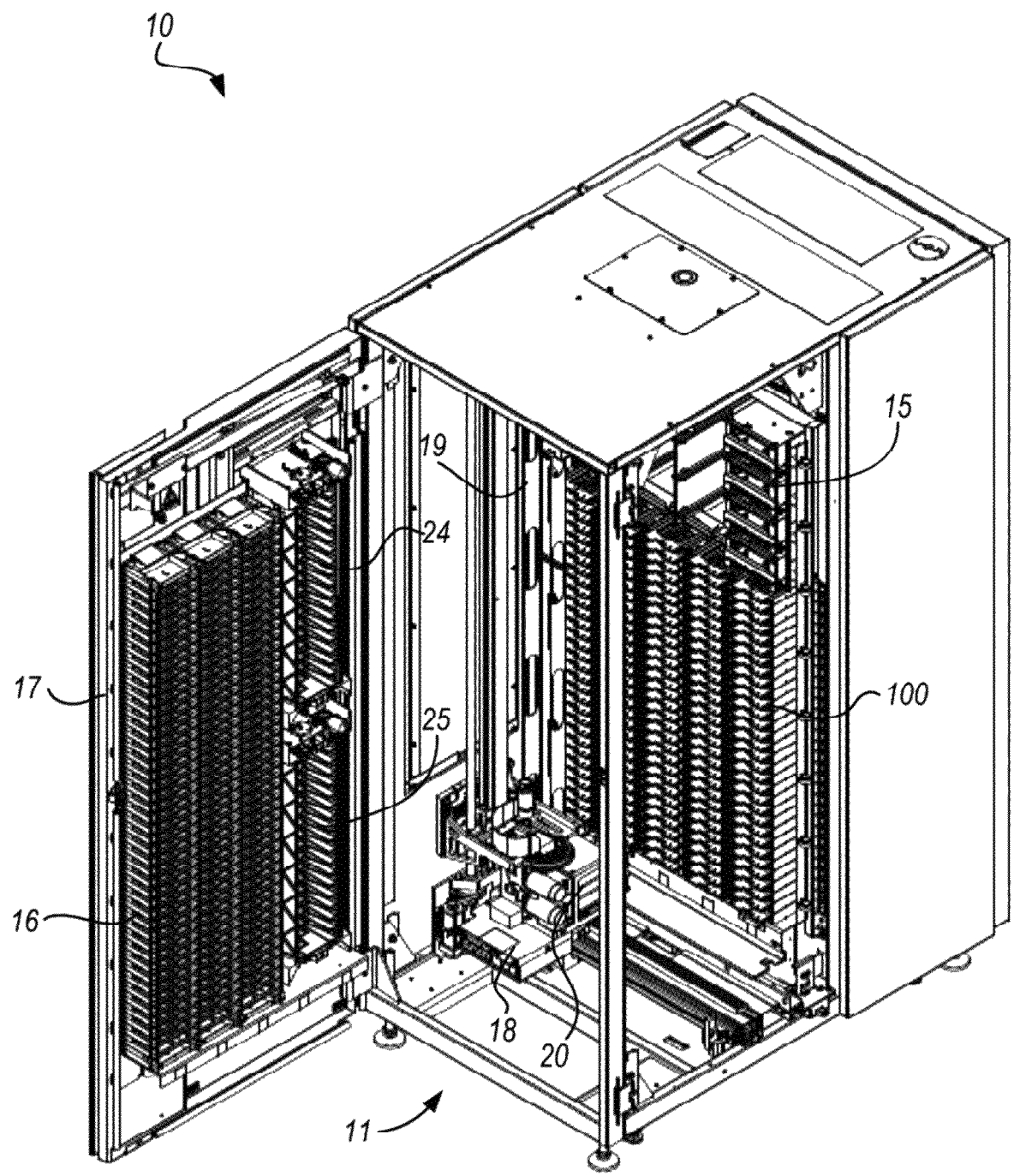
FIG. 2 is a perspective view of the interior of a storage frame from the data storage library of FIGS. 1A & 1B.

FIGS. 1A & 1B and FIG. 2 illustrate an automated data storage library 10 which stores and retrieves data storage cartridges, containing data storage media (not shown), from multi-cartridge deep slot storage cells 100 and single cartridge storage slots 16. An example of an automated data storage library which has a similar configuration as that depicted in FIG. 1A and FIG. 2, and may be implemented with some of the various approaches herein is the IBM 3584 UltraScalable Tape Library.

The library 10 of FIG. 1A comprises a left hand service bay 13, one or more storage frames 11, and right hand service bay 14. The library 10 of FIG. 1B comprises a left hand service bay 13, one or more storage frames 11, a right hand service bay 14 and optional environmental conditioning units 1012 housed within enclosures 1020 which may control the temperature, humidity and/or other environmental conditions in the interior of the library 10. While two environmental conditioning units are shown in FIG. 1B, it will be appreciated that more or less environmental conditioning units 1012, may be associated with the library, and in some circumstances the library may have no environmental conditioning units. As will be discussed in further detail below, a storage frame may comprise an expansion component of the library. Thus, storage frames may be added or removed to expand or reduce the size and/or functionality of the library. According to different approaches, frames may include additional storage slots, deep storage slot cells, drives, import/export stations, accessors, operator panels, library controllers, communication cards, etc. Moreover, an accessor aisle 12 preferably extends between the storage frames and bays of the embodiments in FIGS. 1A & 1B thereby allowing an accessor to move between frames. A moveable and/or deployable panel 21 may be displaced to cover and/or block (as well uncover and/or unblock) aisle 12 from communicating with the exterior of the data storage library. Panel 21 may be moved and/or removed to permit access to the interior of the service bays 13, 14.

FIG. 2 shows an exemplary embodiment of a storage frame 11, which may act as the base frame of the library 10 or may comprise the entire library. Herein, a library frame refers to a non-expandable library, an expandable library and/or an expansion component of a library. The library 10 illustrated in FIG. 2 may have only a single accessor 18 (i.e., there are no redundant accessors) and no service bay. However, in other embodiments, a library may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In one aspect, the interior of the multi-cartridge deep slot cells may be arranged so that the plurality of data storage cartridges are in sequential order of tiers from front to rear (e.g., see FIG. 7A).

With continued reference to FIG. 2, the storage frame 11 of the library 10 may include at least one data storage drive 15, e.g., for reading and/or writing data with respect to the data storage media in the data storage cartridges. Additionally, a first accessor 18 may be used to transport data storage cartridges containing data storage media between the plurality of storage slots 16, the multi-cartridge deep slot cells 100, and/or the data storage drive(s) 15. According to various approaches, the data storage drives 15 may be optical disk drives, magnetic tape drives, or other types of data storage drives that are used to read and/or write data with respect to the data storage media.

As illustrated, the storage frame 11 may optionally include an operator panel or other user interface 23, such as a web-based interface, which allows a user to interact with the library 10. The storage frame 11 may also optionally comprise an upper import/export (I/O) station 24 and/or a lower I/O station 25, thereby allowing data storage cartridges to be added (e.g., inserted or imported) to the library inventory and/or removed (e.g., exported) from the library without having to open front panel 17 or otherwise disrupt library operations. Furthermore, the library 10 may have one or more storage frames 11, preferably accessible by the first accessor 18.

As described above, the storage frames 11 may be configured with different components depending upon the intended function. One configuration of storage frame 11 may comprise storage slots 16 and/or multi-cartridge deep slot cells 100, data readers or drive(s) 15, and or accessors 18, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage cartridges, in addition to having a bar code scanner or other reading system, such as a cartridge memory reader or similar system mounted on the gripper assembly 20, to "read" identifying information about the data storage cartridge.

The service bays may be configured with different components and in different configurations depending upon its intended function. The service bay is typically another frame of the library 10 and, without intent on limiting the disclosure, generally provides an area to house and perform service on the robotic accessor without interfering with the operation of the other library frames. The service bay may include a moveable panel, barrier or door to provide access to its interior and/or to protect someone servicing an accessor or other component associated with the service bay. The service bay may further include one or more data cartridge storage slots, multi-cartridge deep slot storage cells, data cartridges, accessors, data readers or drives, as well as other components.

Figure 3:
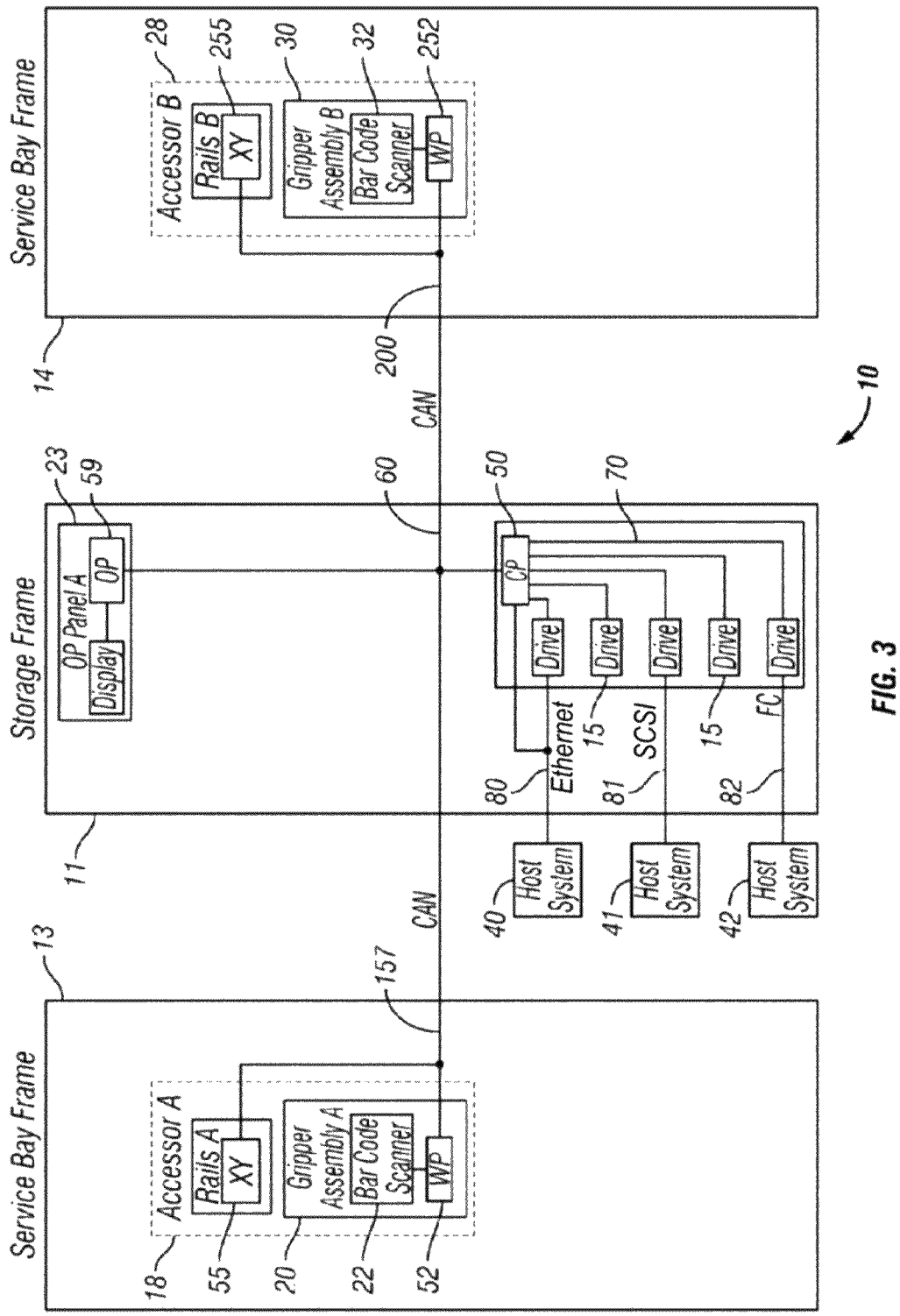
FIG. 3 is a block diagram of one embodiment of an automated data storage library.

FIG. 3 depicts and schematically illustrates an automated data storage library 10, in accordance with one embodiment. As an option, the automated data storage library 10 may be implemented in conjunction with features from any other embodiment listed herein, such as those described with reference to the other FIGS. Of course, however, automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1A & 1B and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as providing a user interface that allows a user to interact with the library, responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner 22 (e.g., reading system) to "read" identifying information about the data storage cartridges depending on the desired embodiment. Furthermore, the right hand service bay 14 is shown having a second accessor 28, which includes a gripper assembly 30 and may also include a reading system 32 to "read" identifying information about the data storage cartridges.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the disclosure or the invention, the first and second accessors 18, 28 may preferably move their grippers in at least two directions, called the horizontal "X" direction and vertical "Y" direction, e.g., to retrieve and grip, deliver and release, load and unload, etc. the data storage cartridges at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, and the data storage drives 15. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a line 70 for communicating with the data storage drives 15, e.g., a communication link. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D¬91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and may communicate with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, e.g., and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, storage cells 100, data storage drives 15, networks 60, etc.

Moreover, as described above, the automated data storage library 10 may comprise a plurality of accessors. For example, in addition to first accessors 18 in service bay frame 13, a second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
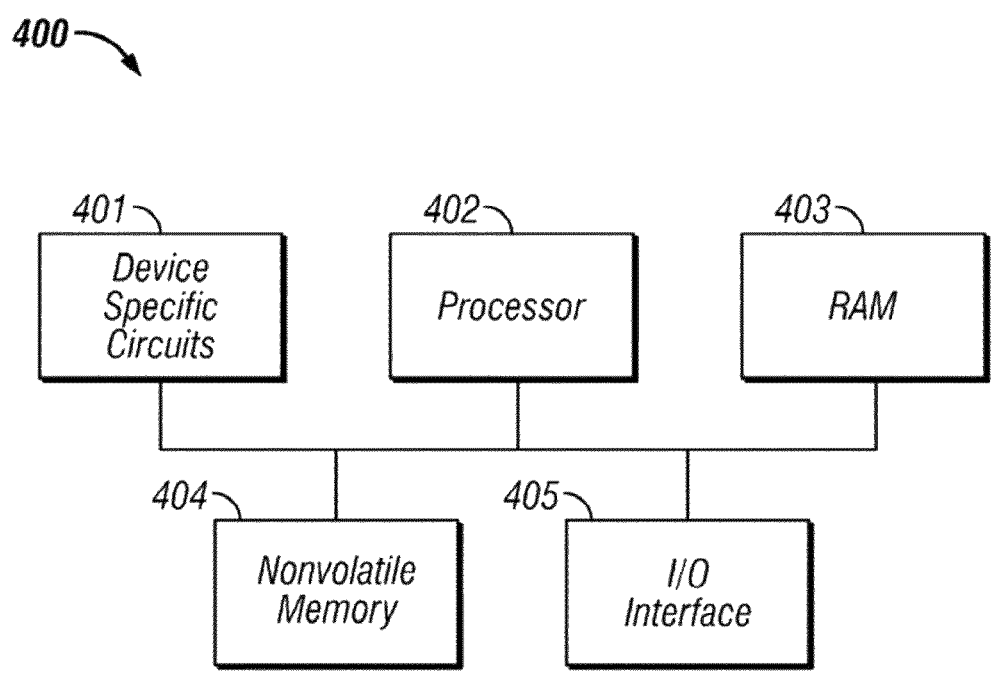
FIG. 4 is a block diagram depicting one embodiment of a controller configuration.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, Ethernet, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
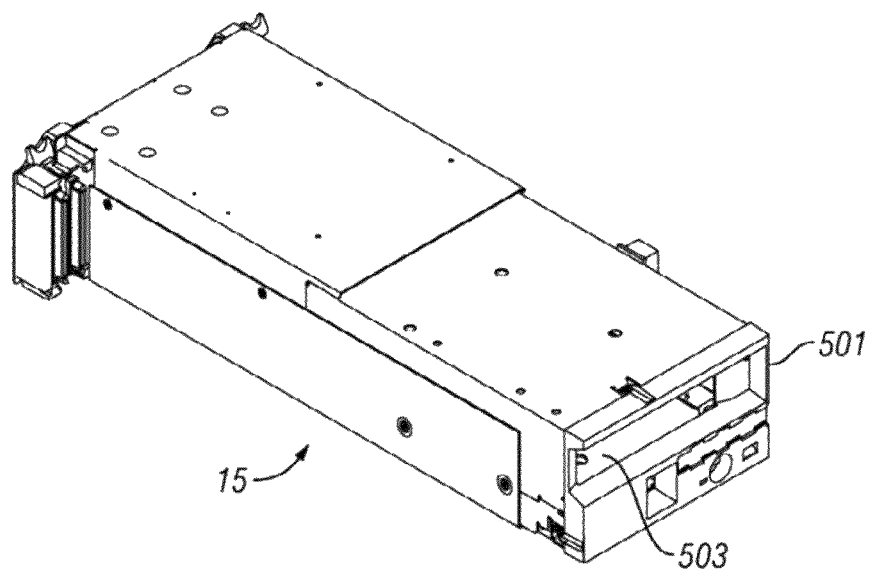
FIG. 5A is a front perspective view of one embodiment of a data storage drive.
Figure 5B:
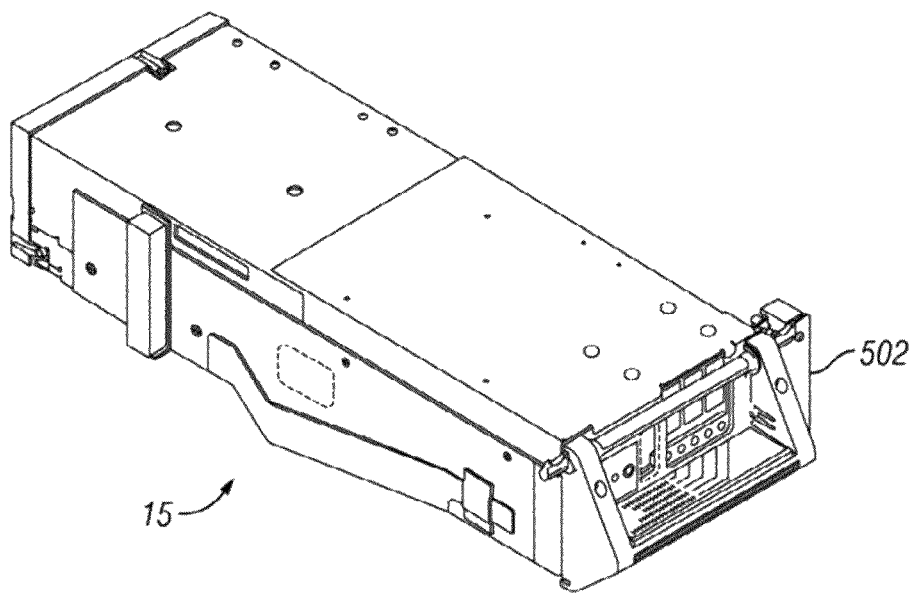
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the disclosure or the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge having data storage media may be placed into the data storage drive 15 at opening 503.

Figure 6:
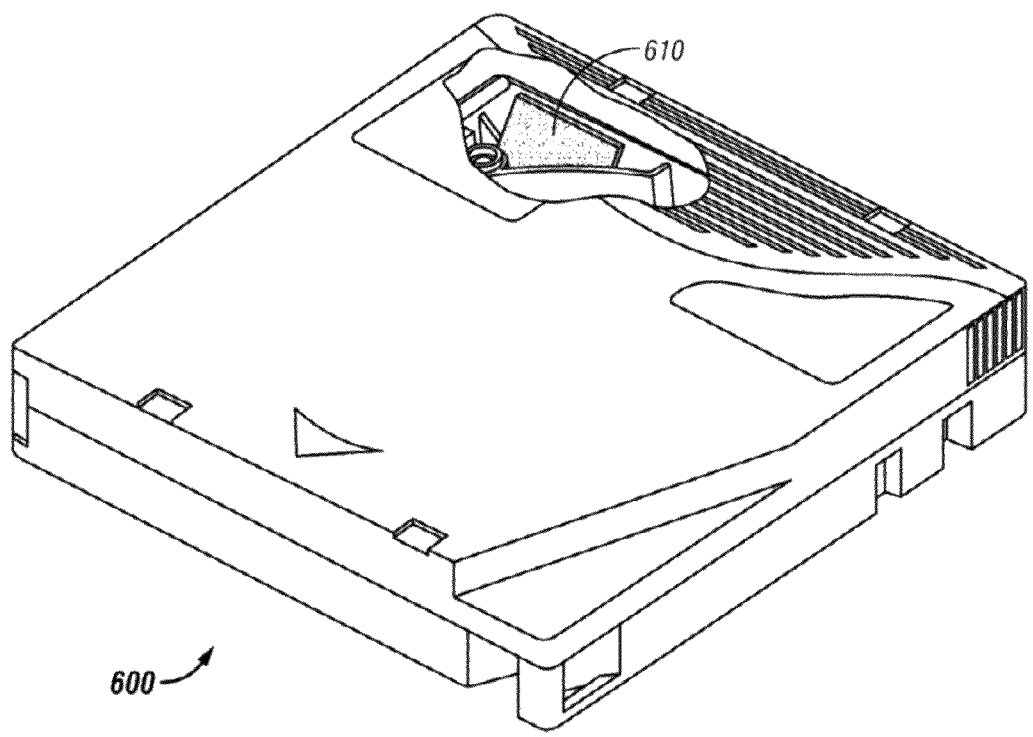
FIG. 6 is perspective view of one embodiment of a data storage cartridge having a cutaway portion.

Furthermore, FIG. 6 illustrates an embodiment of a data storage cartridge 600 with a cartridge memory 610 shown in a cutaway portion of FIG. 6, which is in no way intended to limit the disclosure or the invention. In fact, any configuration of data storage cartridge may be used whether or not it comprises a cartridge memory. According to various approaches, the media of the data storage cartridge may include any type of media on which data may be stored, including but not limited to magnetic media, e.g., magnetic tape, disks, etc.; optical media, e.g., optical tape, disks, etc.; electronic media, e.g., PROM, EEPROM, flash PROM, COMPACTFLASH™, SMARTMEDIA™, MEMORY STICK™, etc.; etc., or other suitable media. Moreover, an example of a data storage cartridge that is widely employed in automated data storage libraries for mass data storage is a magnetic tape cartridge in which the media is magnetic tape.

Figure 7A:
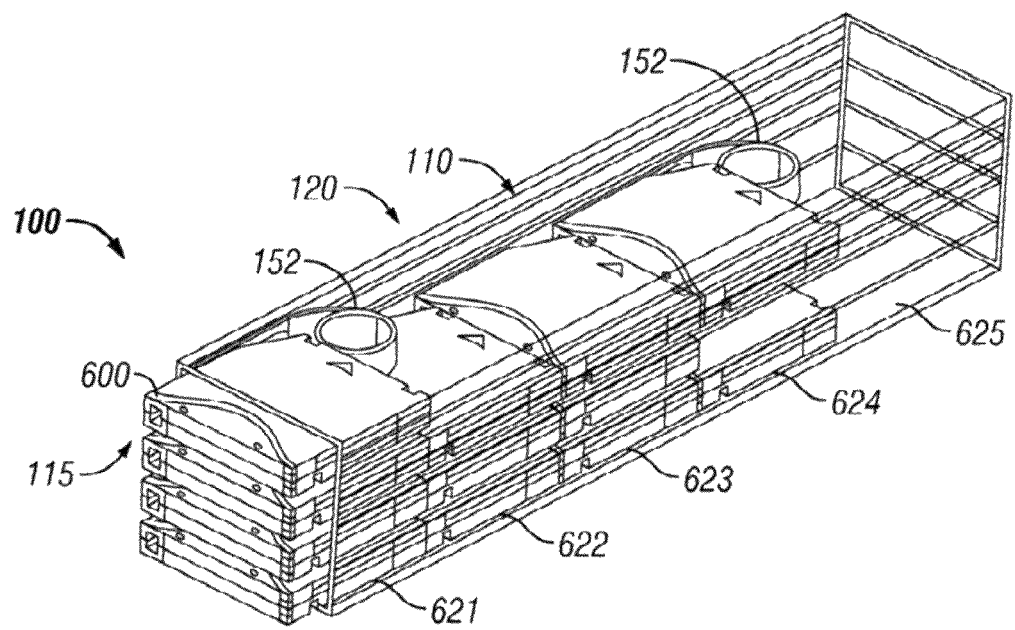
FIGS. 7A-7B are perspective views of one embodiment of a multi-cartridge deep slot cell, where
Figure 7B:
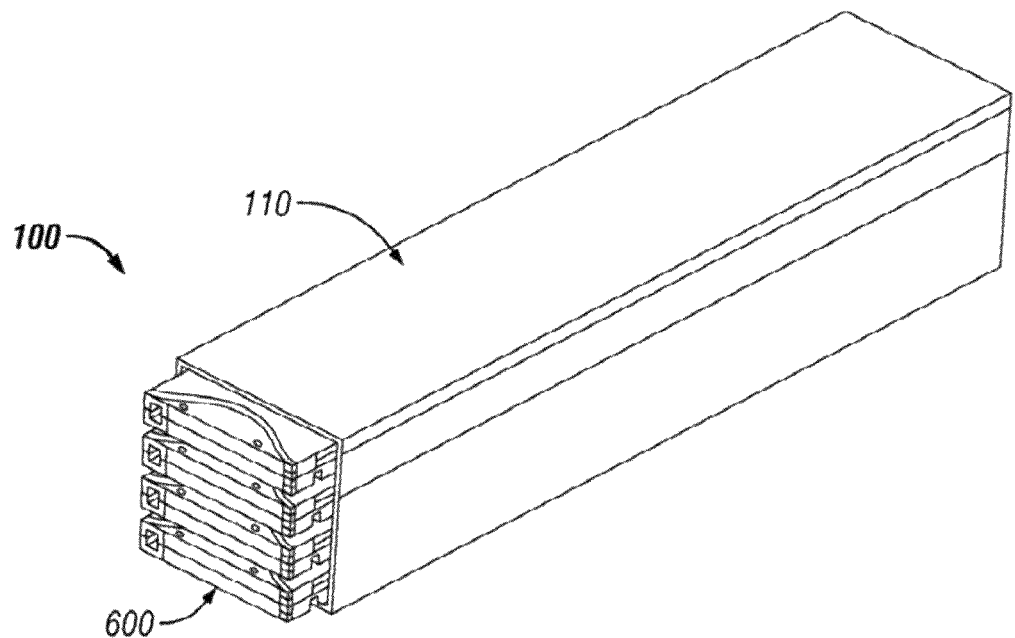

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. A plurality of storage slots 120 is disposed within the housing 110, and may be configured for storing a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening 503 (See FIG. 5A) of the multi-cartridge deep slot cell 100, whereby the retaining gate 660 can be activated by an accessor 18, e.g., of an automated data storage library. Moreover, the retaining gate 660 allows for positive cartridge retention against the pressure of biasing springs (see 152 of FIG. 7A), and ensures that one or more data storage cartridges do not get pushed out of the multi-cartridge deep slot cell 100 simultaneously, while allowing the biasing springs (shown in FIG. 7A) of the multi-cartridge deep slot cell 100 to continuously push data storage cartridge(s) to the opening in a multi-cartridge deep slot cell 100. Thus, according to one approach, the accessor 18 may open the retaining gate 660 to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8A:
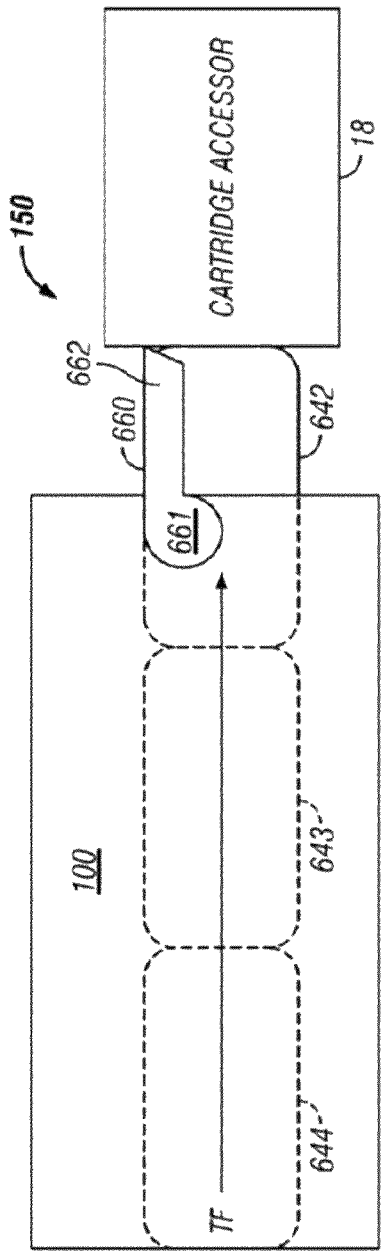

The basic working of the retaining gate is that the gate prevents the data storage cartridge(s) from being pushed out of a multi-cartridge deep slot cell 100. For example, as shown in FIGS. 8A-8D, a retaining gate 660 may be lifted (See FIG. 8B) by, for example, accessor 18 or by a front storage cartridge 642 for cartridge removal/insertion into a multi-cartridge deep slot cell 100. Specifically, retaining gate 660 has a pivoting arm 661 mounted on multi-cartridge deep slot cell 100 via a pivoting post (not shown) that may be integral to or connected to a multi-cartridge deep slot cell 100. Retaining gate 660 includes a catch 662 whereby a thrust force TF through data storage cartridges 644-642 caused by the pushing mechanism biasing springs 152 (shown in FIG. 7A but not shown in FIG. 8A) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown in FIG. 8C). During extraction of front storage cartridge 642 through the front opening of multi-cartridge deep slot cell 100, the retaining gate 660, which is biased downward, moves back to the retaining position to engage storage cartridge 643.

Figure 8B:
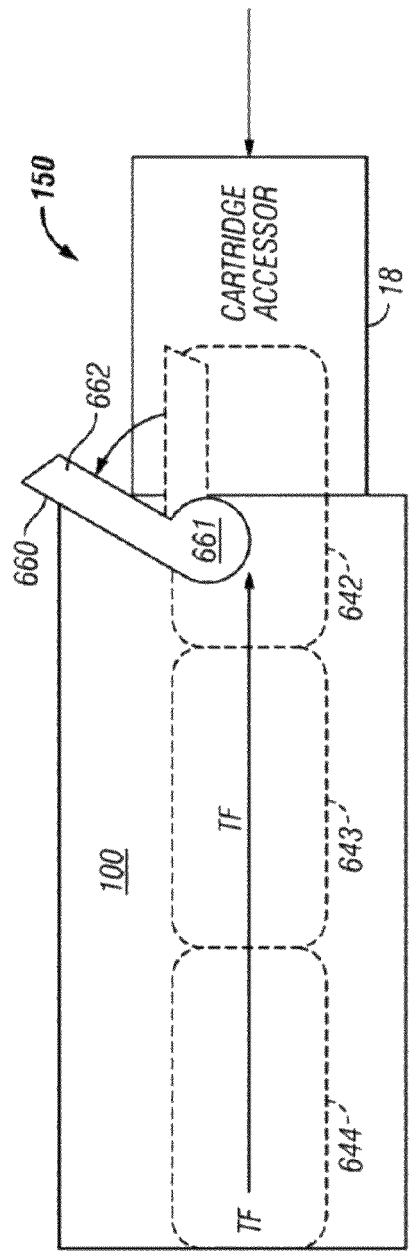

Once front storage cartridge 642 is extracted and storage cartridges 643 and 644 are retained from being pushed out of multi-cartridge deep slot cell 100, retaining gate 660 has successfully completed its cartridge retrieval process. In FIG. 8D, retaining gate 660 demonstrates its ability to insert the data storage cartridges into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface 663 of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion of the data storage cartridge into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

In one embodiment, one or more data storage cartridges may be added into the library, e.g., at an I/O station 24, 25, whereby the controller of the automated data storage library 10 may then control and/or operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
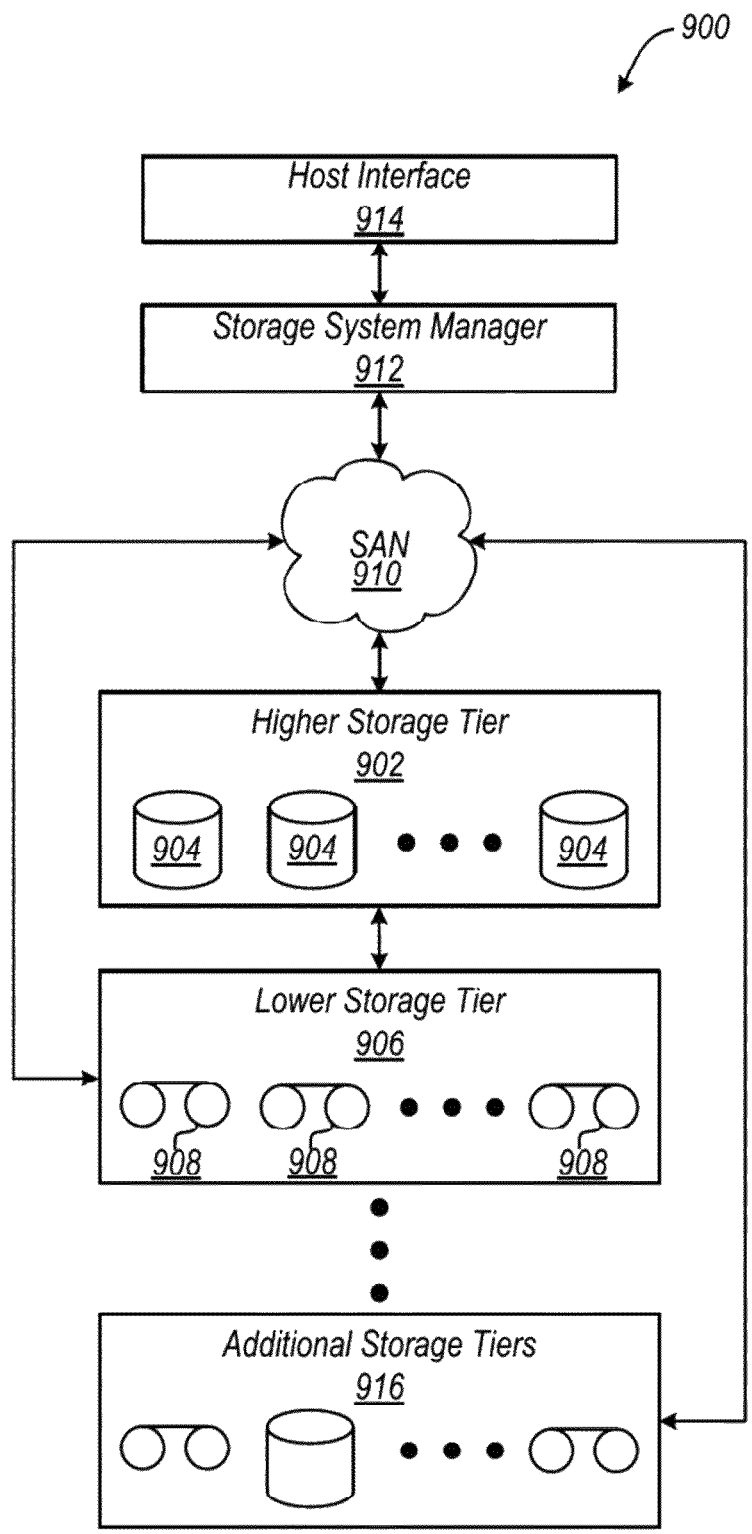
FIG. 9 is a tiered data storage system, in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different data storage media within each storage tier. For example, each data storage tier may include the same type of data storage media, such as HDDs, SSDs, sequential access media (tape in tape drives, optical disk in optical disk drives, etc.), direct access media (CD-ROM, DVD-ROM, etc.), or any combination of data storage media types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Figure 10:
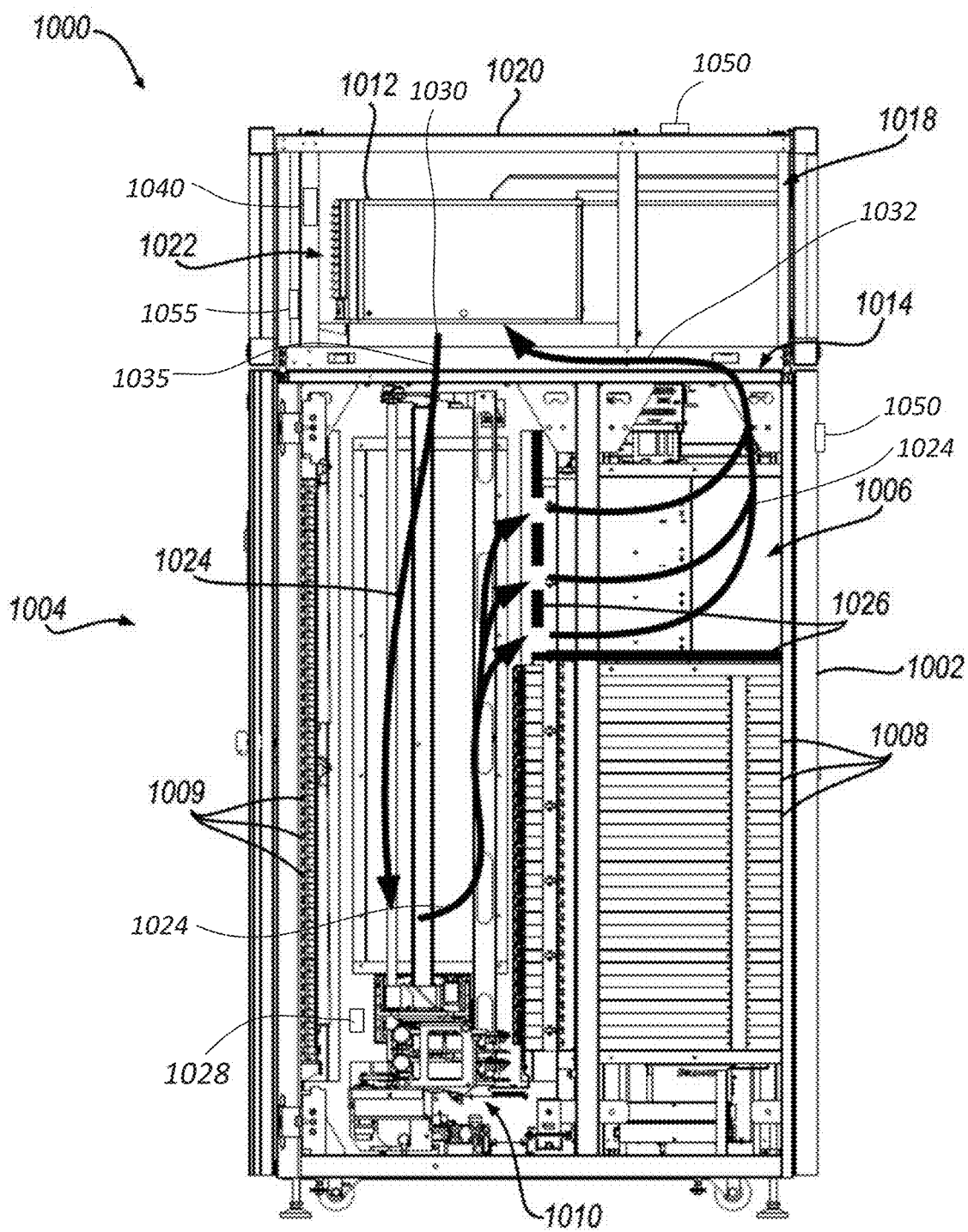
FIG. 10 is a partial side view of one embodiment of the interior of a system for storing and transferring data recording media.

Referring now to FIG. 10, a system 1000 includes a frame 1002 of an automated data storage library 1004. As described above, automated libraries are typically used to store cartridges and drives in large arrays to store large amounts of data. Thus, an interior of frame 1002 is illustrated as a tape library in one embodiment, and is depicted as including one or more tape drives 1006, an area for storing tape cartridges (e.g., multi-cartridge deep slot cells 1008 and single cartridge storage slots 1009), and a robotic accessor 1010, among other components which would be apparent to one skilled in the art upon reading the present description (e.g., see FIG. 2 above).

Automated libraries have traditionally operated in environments having ideal temperature and humidity levels within the operational specifications of the data storage media and drives. As such, automated libraries have previously relied on outside air to flow through the library to keep the drives and data storage media cool as drives heat the air during the process of normal operation (e.g., such as reading and writing data to data storage media). However, as mentioned above, this limits the number of environments an automated data storage library can be implemented in. If the air outside the library is not cool or dry enough, exposing the interior of the library thereto may be harmful to the data storage media and/or the drives. One type of automated library which may be susceptible to exposure to environmental conditions, such as, for example, heat and/or humidity, are automated tape libraries containing tape media and tape drives.

System 1000 of FIG. 10 further includes an optional environmental conditioning unit 1012 associated with, preferably coupled to the frame 1002. The environmental condition unit 1012 may be integrated with and coupled to the frame 1002. For the purposes of the present disclosure, it is to be understood that an environmental conditioning unit may be any device which conditions the air and/or the surrounding environment and is able to change the environmental conditions. The environmental conditions may include (but are not limited to) temperature, humidity, ionization, pressure, etc. In one embodiment, the environmental conditioning unit may be an air-conditioning unit. In other embodiments the environmental conditioning unit may be a thermoelectric heater, a thermoelectric cooler, an electric heater, a liquid cooler, an air conditioner, a heat pump, an evaporate cooler, an ionizer, a de-ionizer, a humidifier, a dehumidifier, one or more fans, etc. An environmental conditioning unit in accordance with one embodiment of the present disclosure may increase or decrease the temperature, humidity, pressure, etc. The environmental conditioning unit 1012 may be coupled to an upper surface 1014 (e.g., the roof) of the frame 1002 as shown in FIG. 1B and FIG. 10. The environmental conditioning unit 1012 preferably operates without negatively affecting the operating conditions in the frame 1002. However, an environmental conditioning unit may be functionally associated with the frame 1002 by positioning the environmental conditioning unit elsewhere and using ducts to route the air to the interior of the frame 1002, coupling the environmental conditioning unit to a side of the frame 1002, coupling the environmental conditioning unit to a bottom of the frame 1002 (underneath the frame 1002), etc., depending on the desired approach.

The environmental conditioning unit 1012 is preferably configured such that it may regulate the relative conditions (e.g., temperature, humidity, pressure, ionization, contaminant presence via filtering, etc.) inside the frame 1002. Thus, according to different approaches, the environmental conditioning unit may be able to reduce the temperature in the interior of the frame 1002 and/or reduce the relative humidity of the interior of the frame 1002, depending on the type of environmental conditioning unit 1012 employed. The environmental conditioning unit 1012 is preferably configured to turn on and off as desired to maintain a selected temperature, humidity and/or other conditions in the interior of the frame 1002. Alternatively, the environmental conditioning unit may have a fan and the fan can be left always on to keep air circulating within the interior of the frame. In one embodiment, the environmental conditioning unit may be an air conditioning unit and the fan may be continuously on and the condenser may turn on and off to maintain a selected temperature and/or humidity in the interior of the frame 1002.

As would be appreciated by one skilled in the art, the environmental conditioning unit 1012 may be an air conditioning unit and may be able to adjust the relative temperature and/or humidity of the interior of the frame 1002 in a conventional manner. Cold air may flow into the interior of the frame 1002 via an inlet air duct 1030 which may connect the environmental conditioning unit 1012 to the interior of the frame 1002, and form an inlet 1035 in the upper surface 1014 of the frame 1002. Specifically, an inlet air duct 1030 may direct the air cooled by the environmental conditioning unit 1012 into the interior of the frame 1002, e.g., where the majority of the data storage media may be stored. As a result, air flow is created from the environmental conditioning unit 1012 to the interior of the frame 1002, as indicated by arrows 1024. This air flow may be induced by a fan included in the environmental conditioning unit 1012 and/or by using the fans in the one or more tape drives 1006, as will be described in further detail below.

Once in the interior of the frame 1002, the air flow may extend past the multi-cartridge deep slot cells 1008 and single cartridge storage slots 1009, eventually being carried past and/or through the one or more tape drives 1006. Thus, the air being cycled through the environmental conditioning unit transfers heat from the interior of the frame 1002 and the tape drives 1006. A baffle or baffles 1026 are preferably configured to isolate hot air produced by (e.g., exiting) the tape drives 1006 from the area for storing tape cartridges. In other words, a baffle or baffles 1026 are preferably configured to create hot and cold air separation in the interior of the frame 1002. As mentioned above, magnetic tape and other magnetic media may degrade when exposed to undesirable (e.g., hot, humid, etc.) conditions. Thus, it is preferred to inhibit and/or prevent the heat produced by the tape drives 1006 from returning to the area for storing tape cartridges.

The air flow is preferably directed through the gaps in the vertical baffle, allowing the conditioned air to flow through each of the tape drives 1006. The gaps in the vertical baffle may also be used by the robotic accessor 1010 to provide tape cartridges to the tape drives 1006. Moreover, the horizontal baffle is preferably used to prevent air from flowing to the multi-cartridge deep slot cells 1008 once it has passed through the tape drives 1006. The air exiting the tape drives is hot (e.g., at least hotter than when it left the environmental conditioning unit 1012), and may negatively affect exposed magnetic tape. Thus, air exiting the tape drives 1006 is preferably directed back to the environmental conditioning unit 1012 to be conditioned (cooled, dehumidified, filtered, etc.) for further use as would be appreciated by one skilled in the art upon reading the present description. Although the air flow is preferably directed from the environmental conditioning unit 1012 to the interior of the frame 1002, and from the interior of the frame 1002 back to the environmental conditioning unit 1012, the particular path that the air flow is shown as extending along in the present embodiment by arrows 1024 is in no way intended to limit the disclosure or the invention.

With continued reference to FIG. 10, system 1000 may include an enclosure 1020 for the environmental conditioning unit 1012. An additional fan 1040 may be included in the enclosure 1020 for passing ambient air over external components of the environmental conditioning unit 1012 to further promote heating, cooling and/or conditioning of the air. Moreover, the enclosure 1020 may include an opening, a baffle or baffles, etc. to direct ambient air exterior to the library 1004 toward an inlet 1022 of the environmental conditioning unit 1012.

In one embodiment, any vents, voids, seams, etc. in the frame 1002 of the library 1004, other than inlet 1035 and an outlet 1032 in an upper surface 1014 of the frame 1002, are preferably sealed such that air from outside the frame 1002 is restricted and/or impeded from entering the interior thereof. This may effectively seal the frame 1002 of the automated data storage library 1004 such that the air flow circulating through the environmental conditioning unit 1012 is the only air moving into and out of the interior of the frame 1002. As a result, tape drives 1006, magnetic tape media stored in the library 1004, etc., or other components in the frame 1002 may be isolated from the environment external of the frame 1002/library 1004 and any unfavorable conditions which may be associated therewith. The frame 1002 may be sealed using any processes which would be apparent to one skilled in the art upon reading the present description, e.g., including but not limited to inserting foam, implementing insulating seals, etc. New frames may be built without any vents, voids, seams, etc. The housing and panels enclosing the frame 1002 may also be insulated to prevent or inhibit unconditioned air from entering the frame 1002.

The frame 1002 may also include one or more environmental sensors 1050 exterior to the library 1004 and may also include one or more sensors 1055 exterior to the library 1004 but inside the enclosure 1020 of the environmental conditioning unit 1012. In one embodiment the sensors 1055 may be located in front of inlet 1022 of the environmental conditioning unit 1012. The environmental sensors 1050, 1055 may be any sensor appropriate for determining the environmental conditions at the sensor location, such as one or more temperature sensors, one or more humidity sensors, one or more pressure sensors, etc. The one or more environmental sensors 1050, 1055 may be in communication with environmental conditioning unit 1012 and/or a library controller, such as library controller 400 shown and described with respect to FIG. 4. The one or more signals provided by the environmental sensors 1050, 1055 may be utilized to control (e.g., adjust) the output and operation of the environmental conditioning unit 1012.

System 1000 illustrated in FIG. 10 may further comprise one or more environmental sensors 1028 disposed within the interior of the library 1002. The environmental sensor(s) may be any appropriate sensor for determining the environmental conditions within the frame 1002, such as, for example, one or more temperature sensors, one or more humidity sensors, one or more pressure sensors, etc. The one or more environmental sensors 1028 may be in communication with environmental conditioning unit 1012 and/or a library controller, such as controller 400 shown and described with respect to FIG. 4. As such, the signal provided by the one or more environmental sensors 1028 may be utilized to control (e.g., adjust) the output and operation of the environmental conditioning unit 1012.

Although the embodiment illustrated in FIG. 10 includes a single frame 1002 and a single environmental conditioning unit 1012, other embodiments may include additional frames and/or environmental conditioning units.

While a data storage library having an integrated environmental conditioning unit advantageously controls the environmental conditions within the library, some challenges may exist when components within such a data storage library need to be serviced or replaced. As noted above, many data centers are now maintained at higher temperatures and higher humidity levels to reduce the costs relating to cooling the data center. For this reason, environmental conditions of the data center may be substantially different from those within a data storage library, particularly a data storage library having an environmental conditioning unit. As such, a component (such as a data storage cartridge) that is moved abruptly from the warm, humid environment of the data center, for example, to the cool, dry environment of the data storage library may develop condensation on surfaces thereof. Additionally, moving components (such as a data storage cartridge) from the cool, less humid environment of the data storage library to the warmer, more humid data center may also develop condensation on surfaces. Moisture build-up on surfaces of sensitive components such as data storage cartridges and tape drives is undesirable, as moisture may lead to failure of the components and/or data loss. Tape cartridges and magnetic tape media may be susceptible to the formation of condensation which may negatively impact the performance of a tape library.

Thus, in accordance with aspects of the present disclosure, one or more media acclimation devices may be associated with a data storage library so as to gradually acclimate components (e.g., data storage cartridges) that are moved from a first environment (e.g., a hot and humid data center) into a second environment (e.g., a cool and dry data storage library), in order to inhibit and/or avoid undesirable effects (e.g., the formation and/or accumulation of condensation and moisture). Similarly, the one or more media acclimation devices may also acclimate the components to be moved from the second environment (e.g., a cool and dry data storage library) into the first environment (e.g., a hot and humid data center). To gradually change the environment within the media acclimation device(s), one or more media acclimation devices may be associated with and/or incorporate one or more environmental control devices, such as an electric heater, a thermoelectric heater, a thermoelectric cooler, a liquid heater, a liquid cooler, an air conditioner, a heat pump, an evaporative cooler, an ionizer, a deionizer, a humidifier, a dehumidifier, one or more fans, a filter, or any known environmental device, and combinations thereof that may change environmental conditions. Herein, a library environmental conditioning unit may serve as the environmental control device. For example, a library environmental conditioning unit may be the environmental control device for the media acclimation device and the conditioned air from the environmental conditioning unit may be delivered to the media acclimation device in a controlled fashion, as will be described.

The media acclimation device may take many forms and in some embodiments may comprise a housing or enclosure that insulates, separates and/or isolates the interior environment of the media acclimation device from the interior of the data storage library and/or from the exterior of the data storage library. In some embodiments the media acclimation device may have one or more access ports or openings for receiving data storage tapes, and the one or more access ports or openings may have one or more environmental barriers (e.g., a door, hatch, cover, air curtain, hanging slots or flaps, split membrane, separable membrane or slot that opens when a cartridge is inserted or removed, or any other method of providing an environmental barrier at an opening). In embodiments, the acclimation device may include one or more modified I/O stations, data storage cartridge slots, deep slot storage cells, modified data storage drive bays and/or modified assessors.

In one aspect of the present disclosure, the media acclimation device comprises one or more storage slots or locations for receipt of one or more data storage cartridges. The media acclimation device may include individual storage slots, with one or more environmental control devices, e.g. thermoelectric elements, associated with, located in or around one or more storage slots. Alternatively, the media acclimation device may comprise a group of storage slots, with one or more environmental devices associated with, located on and/or around the group of storage slots. The one or more storage slots may be inside an enclosure to help maintain the environmental conditions. In addition, the one or more storage slots may have a flap or door that helps maintain the environment inside the slot. For example, the deep storage slot cell 100 in FIGS. 7A and 7B may be modified to include or form a media acclimation device which may contain one or more slots or locations for holding a plurality of data storage cartridges much like the deep storage slot cell described with respect to FIGS. 7A and 7B. The media acclimation device may comprise the entire modified deep storage slot cell or a portion thereof.

The modified deep storage slot cell and/or single storage slots forming or including the media acclimation device may be constructed to fit into an existing slot of a data storage library. In one embodiment the deep storage slot cell 100 and/or single storage slots 16 may be modified to have a door to act as and form a barrier to isolate the media acclimation device from the interior of the data storage library, and/or from the exterior of the data storage library. In another embodiment, the deep storage slot cell and/or single storage slots may be modified to form a media acclimation device that includes one or more environmental control devices associated with, located in or around the media acclimation device to change the environmental conditions in the media acclimation device. Alternatively or additionally, the modified deep slot storage cell and/or single storage slot(s) having or forming the media acclimation device may have one or more environmental sensors associated with, located within, around or exterior to the media acclimation device to monitor environmental conditions (e.g., temperature, humidity, etc.) within the media acclimation device and outside the media acclimation device. The one or more environmental sensors may be in communication with an environmental control device and/or a library controller, such as controller 400 shown and described with respect to FIG. 4. The communication of the one or more environmental sensors may be utilized to control (e.g., adjust) the output and operation of the environmental control device. Another example of a media acclimation device comprising one or more storage slots is a magazine. A magazine is a removable enclosure that contains one or more storage slots. Storage slot as used herein refers to a physical location, either fixed or removable, for storing or holding a cartridge.

Figure 11:
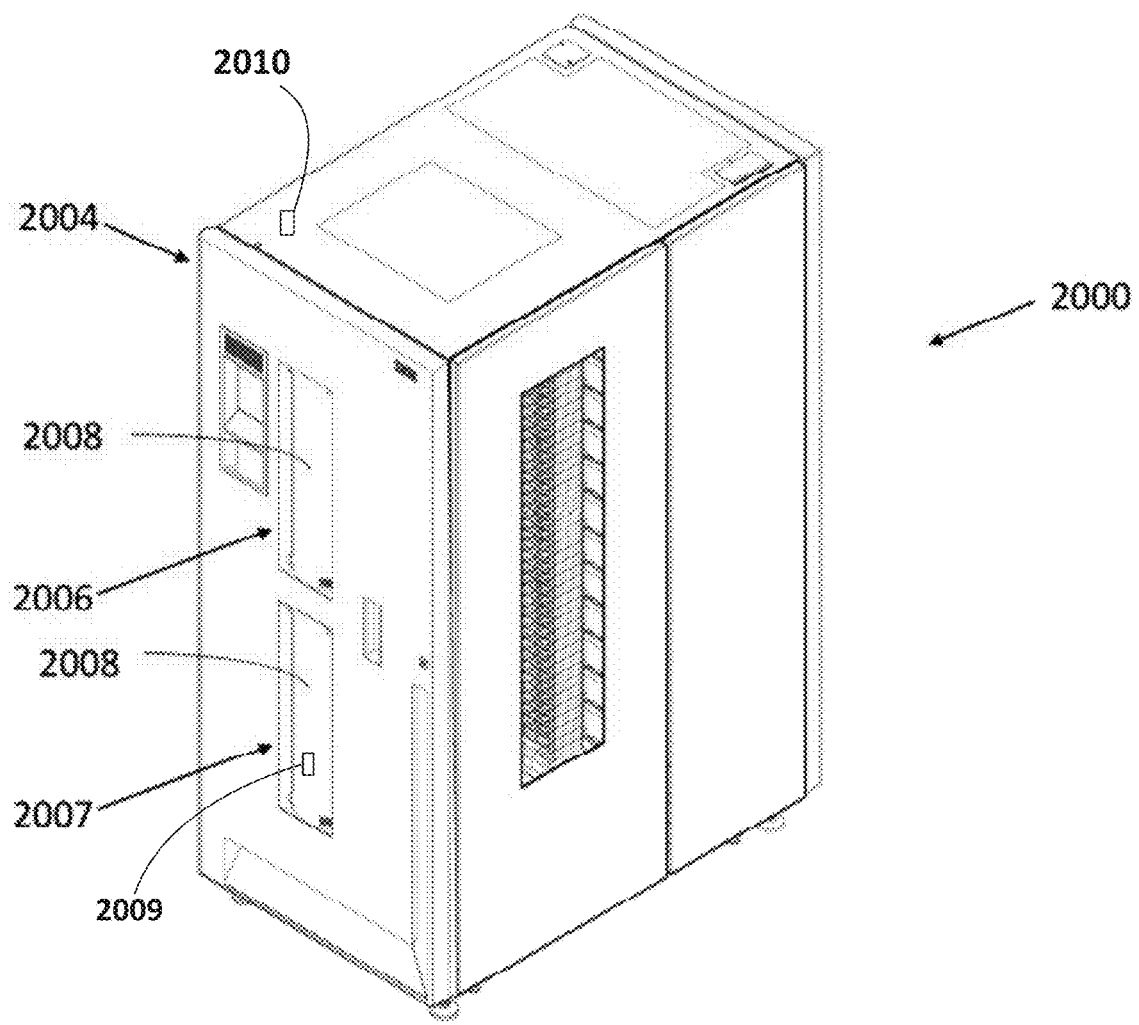
FIG. 11 is a perspective view of one embodiment of a data storage library.
Figure 15:
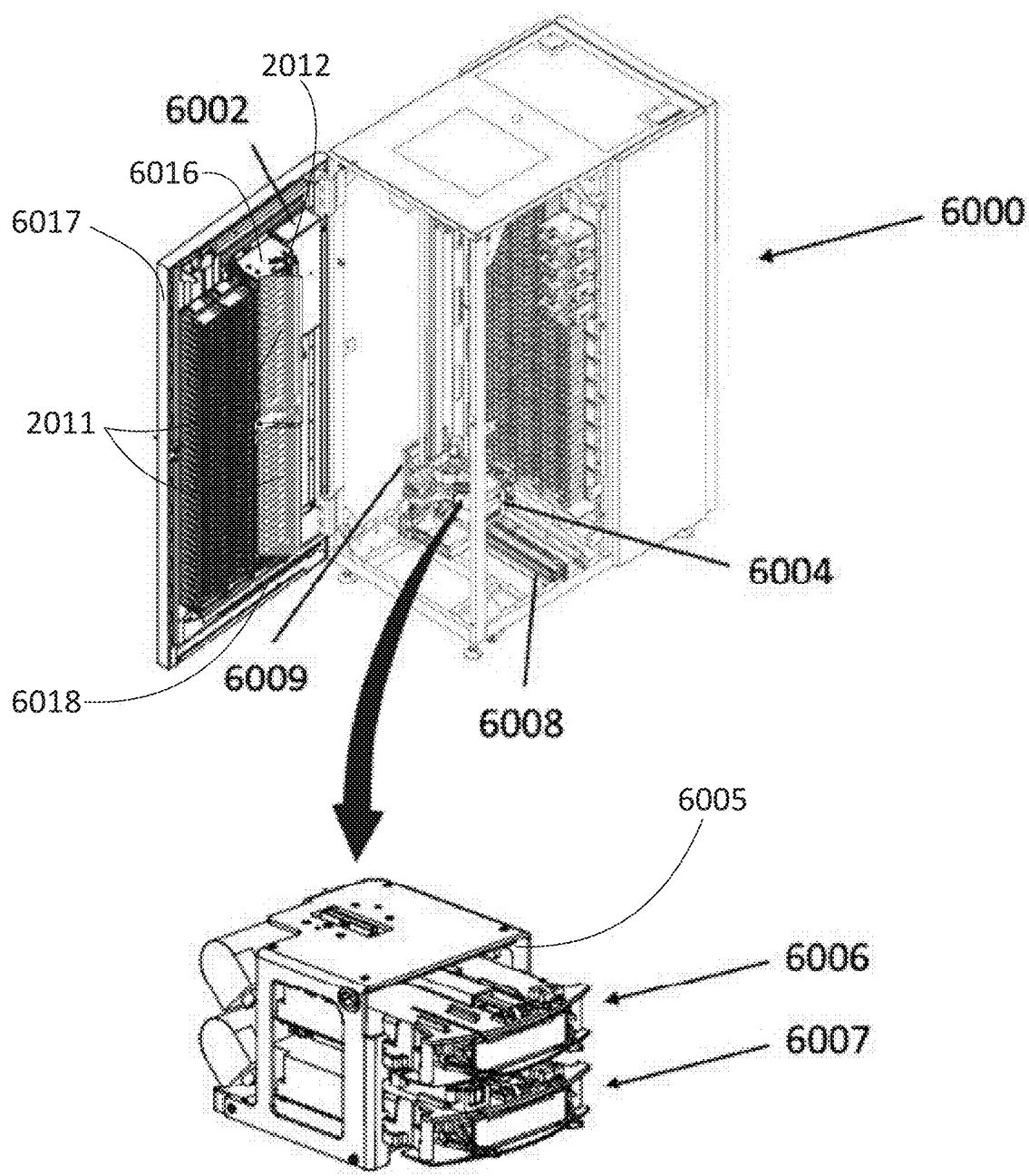
FIG. 15 is a perspective view of one embodiment of a data storage library and robotic accessor.

In one example, FIG. 11 illustrates a library frame 2000, wherein library frame 2000 has a front access door 2004 that is normally closed. Library frame 2000 is similar (but not identical) to library frame 10 described above with respect to FIG. 2. Front access door 2004 comprises an upper I/O station 2006 and lower I/O station 2007, which enable data storage cartridges to be imported (e.g., inserted) into one or more storage slots within the upper I/O station 2006 and/or the lower I/O station 2007 by an operator for eventual retrieval by an interior accessor, much like the upper I/O station 24 and lower I/O station 25 described with respect to FIG. 2. However, in one embodiment of the present disclosure, at least a portion of at least one of I/O stations 2006, 2007 comprises a media acclimation device 2012 as illustrated in FIG. 15. In one embodiment, one or both of I/O stations 2006, 2007 may have a door 2008 on their respective exterior-facing, front sides so as to maintain the environment conditions within the I/O stations 2006, 2007. Door 2008 may help control access to the media cartridges in the I/O stations and to allow the I/O station to be locked, and may be specifically designed to act as an environmental barrier. For example, door 2008 may be insulated and may provide a seal when closed. Furthermore, one or more of I/O stations 2006, 2007 may also comprise at least one second door 2011 on an interior-facing side thereof, as illustrated in FIG. 15. Accordingly, the one or more exterior doors 2008 and one or more interior doors 2011 may help isolate the media acclimation device 2012 from the interior and exterior of the data storage library (the library frame) and may help maintain the environmental conditions inside the I/O stations 2006, 2007, as will be described further below.

Either one or both of the exterior door 2008 and the interior door 2011 may comprise an electric door controlled by a library controller, such as controller 400 shown and described with respect to FIG. 4. Alternatively, either or both of the exterior door 2008 and the interior door 2011 may comprise a mechanical door, which may be controlled (i.e., opened or closed) by certain movements of a robot accessor and/or by the manual removal of a data storage cartridge stored within I/O stations 2006, 2007. Additionally, or alternatively, the exterior door 2008 and/or interior door 2011 may be manually moved by an operator or technician. Additionally, or alternatively, the exterior door 2008 and/or interior door 2011 may be moved by one or more electro mechanical devices (e.g., motors, actuators, etc.). The electro mechanical devices may be controlled by a library controller, such as controller 400 shown and described with respect to FIG. 4. Either one or both of the exterior door 2008 and/or interior door 2011 may comprise a locking mechanism that prevents the door from being opened until the environmental conditions on one side of the door are within a range of the environmental conditions on the other side of the door. The locking mechanism may be controlled by a library controller, such as controller 400 shown and described with respect to FIG. 4.

One or more environmental sensors 2010 may also be associated with, disposed on or near library frame 2000, in this embodiment, preferably the exterior of the library frame, so as to monitor the environmental conditions (such as, for example, temperature, humidity, etc.) outside of the data storage library (i.e., within the data center). The environmental sensor(s) 2010 may be in communication with a library controller, such as controller 400 shown and described with respect to FIG. 4. One or more environmental sensors may also be associated with, positioned in and/or near the media acclimation device formed by at least a portion of the I/O stations 2006, 2007 to monitor the environmental conditions (e.g., temperature, humidity, etc.) inside the media acclimation chamber 2012. The one or more environmental sensors associated with, positioned inside, and/or near the media acclimation device 2012 also may be in communication with the library controller, such as controller 400 shown and described in FIG. 4. The communication of any or all of the environmental sensors may be utilized to control (e.g., adjust) the output and operation of the environmental control device. In another example, the I/O stations 2006, 2007 may comprise magazines and may not have exterior doors 2008. The magazines may comprise a locking mechanism that prevents the magazine from being removed until the environmental conditions on the inside of the magazine are within a range of the environmental conditions outside of the data storage library. The locking mechanism may be controlled by a library controller, such as controller 400 shown and described with respect to FIG. 4.

In one embodiment utilizing at least a portion of I/O stations 2006, 2007 as a media acclimation device 2012, the environmental conditions within the portion(s) of I/O stations 2006, 2007 may acclimate passively. That is, when it is desirable to transport one or more data storage cartridges from outside the data storage library—e.g., in the data center—to the interior of the data storage library, the exterior door 2008 of one or both of I/O stations 2006, 2007 may be opened (either partially or fully), while the interior door(s) 2011 may remain closed. Due to exterior door 2008 being opened, ambient air from the exterior environment of the data storage library naturally enters the exposed portions of I/O stations 2006, 2007. Accordingly, depending upon how long the exterior door 2008 is opened as well as other factors, the respective storage slots of I/O stations 2006, 2007 acclimate toward and may reach the environmental conditions of the space surrounding the data storage library. When the conditions in the I/O stations 2006, 2007 are appropriate or met a threshold (e.g., approximate or are the same as the environmental conditions in the data center), the data storage cartridges are placed in the I/O stations 2006, 2007 for eventual placement into the data storage library. Next, exterior door 2008 may be closed (and the interior door 2011 may remain closed or may be partially opened), and the conditions within the respective storage slots of I/O stations 2006, 2007 may gradually change to be closer to the interior environmental conditions of the data storage library simply through the conductive and/or convective heat transfer to the I/O stations 2006, 2007. This gradual change (or acclimation) allows the inserted data storage cartridge to slowly ramp down or up in temperature, humidity, and/or or other environmental conditions, which may inhibit and/or avoid condensation from forming and/or accumulating on the data storage cartridge(s) due to abrupt changes in temperature and humidity. When the data storage cartridge(s) are properly acclimatized, the interior door 2011 of the I/O stations 2006, 2007 may be opened, and the data storage cartridge(s) may be accessed by the accessor for functional use within the data storage library.

It is also to be understood that the present embodiment also provides for media acclimatization in the reverse direction. That is, when one or more data storage cartridges are to be removed from the data storage library, the at least a portion of the I/O stations which serves as media acclimation device 2012 is conditioned to approximate the conditions of the interior of the library (e.g., at the environmental conditions of the tape cartridges). This may require the interior door 2011 of the I/O stations 2006, 2007 to remain open for a predetermined period of time (or until a predetermined environmental condition is sensed by one or more environmental sensors associated with and which detect the environmental conditions inside the media acclimation device) so as to allow the slots within I/O stations 2006, 2007 to acclimatize to the environmental conditions within the interior of the data storage library. After the predetermined period of time has passed (or an environmental condition has been reached or nearly reached), the accessor may place the data storage cartridges inside the media acclimation device 2012 formed in at least a portion of the I/O stations 2006, 2007, the interior door 2011 may close, and exterior door(s) 2008 may remain closed (or may be partially opened) such that the environmental conditions within the slots of the I/O stations 2006, 2007 slowly ramp toward the exterior environmental conditions. When the data storage cartridge(s) are properly acclimatized, the exterior door(s) 2008 of the I/O stations 2006, 2007 may be opened, and the data storage cartridge(s) may be removed by a user.

In one embodiment, the exterior doors 2008 may have vents 2009 in communication with the interior of the media acclimation device and the exterior of the data storage library that may be movable, preferably between open and closed positions. The vents in the exterior door 2008 may be operable to permit air from the exterior of the library to more easily infiltrate into the media acclimation device 2012 to adjust the conditions inside the media acclimation device 2012. While the vents 2009 are described and depicted as being on the exterior door 2008, it will be appreciated that the vents may be in other locations to be in communication with the interior of the media acclimation device 2012 and the environment exterior to the library. The vents 2009 may be manually operable by an operator or technician, operable by a library controller, and/or operable by the accessor. In the process where a data storage cartridge from inside the library is being gradually acclimatized to the conditions outside the library, after the data storage cartridge has been placed in the media acclimation device 2012 formed by at least a portion of the I/O station 2006, 2007, the interior door may be closed, and the vents 2009 may be opened so that the conditions in the media acclimation device slowly adjust to the exterior conditions of the library which may inhibit or prevent the formation of condensation or other adverse conditions.

It will be appreciated that the vents 2009 may be controlled and operated immediately upon closing interior door 2011 to the media acclimation device 2012, after a predetermined amount of time after the interior door 2011 is closed, and/or in response to the conditions inside the media acclimation device 2012 reaching equilibrium but not necessarily meeting or within appropriate range of the environmental conditions outside the library. It should further be appreciated that the environmental sensors associated with and for measuring conditions in the media acclimation device 2012, inside the library, and exterior to the library may be utilized to determine when and if the vents 2009 should be utilized and to what degree.

In accordance with another aspect of the disclosure, one of I/O stations 2006, 2007 may be utilized for transferring data storage cartridges into the data storage library (import), while the other may be utilized for transporting data storage cartridges from the data storage library (export). In this way, one of I/O stations 2006, 2007 may be initially prepared for inserting data storage cartridges therein, without the need to ramp environmental conditions toward the external (or ambient) conditions outside of the data storage library. Likewise, the other of I/O stations 2006, 2007 may be initially prepared for exporting one or more data storage cartridges by the internal accessor, thereby avoiding the need to ramp the environmental conditions within the other I/O station 2006, 2007 toward the internal conditions of the data storage library. In one embodiment, in order to optimize the efficiency of import/export with the acclimation process, the I/O station that was used for import becomes an export I/O station after it has been acclimated to the inside environment of the library. Likewise, the I/O station that was used for export becomes an import I/O station after it has been acclimated to the exterior environment of the library. This way, an additional acclimation step is avoided by not having to return the environmental state of the I/O station after an import or export operation is completed.

In an alternative embodiment utilizing at least a portion of I/O stations 2006, 2007 as a media acclimation device 2012, the environmental conditions within the portion(s) of I/O stations 2006, 2007 acting as the media acclimation device may be acclimated actively. That is, one or more fans (not shown) may be incorporated into the I/O stations 2006, 2007 or adjacent portions of the library frame 2000 so as to move air either from the ambient environment outside of the library frame 2000 or the conditioned environment within the library frame 2000. The one or more fans may be controlled to move air into the portions of the I/O stations 2006, 2007 being utilized as a media acclimation device 2012 to gradually condition (e.g., warm, cool, humidify, dehumidify, pressurize, depressurize, ionize, deionize, etc.) its interior environment. The movement of air into these portions of the I/O stations 2006, 2007 that forms the media acclimation device 2012 may be done as a preparation step (i.e., prior to insertion of the data storage cartridge(s)) or as an active part of acclimating the environmental conditions of the data storage cartridge. The embodiment may include two or more fans, with a first fan (or group of fans) operative to move exterior ambient air into the I/O stations 2006, 2007, and a second fan (or group of fans) operative to move interior conditioned air into the I/O stations 2006, 2007. Alternatively, a single fan for each of I/O stations 2006, 2007 could be used for both actions simply by changing the fan's direction of rotation. Alternatively, instead of, or in addition to, a fan or fans actively acclimating I/O stations 2006, 2007, one or more other environmental control devices, e.g., thermoelectric devices, could be used to heat and cool the air inside the media acclimation device formed as at least a portion of the one or more of I/O stations 2006, 2007. In fact, any known environmental device, such as a thermoelectric heater, a thermoelectric cooler, an electric heater, a liquid heater, a liquid cooler, an air conditioner, a heat pump, an evaporative cooler, an ionizer, a de-ionizer, a humidifier, a dehumidifier, one or more fans, etc. or any combination thereof, may be utilized. The embodiment utilizing the environmental control devices and/or fans may also utilize the vents that communicate the interior of the media acclimation device 2012 with the exterior of the library and/or the conditioned interior of the library. Another example of an I/O station may comprise a magazine (not shown). A magazine is a removable enclosure that contains one or more storage slots. Herein, I/O station refers to a structure, enclosure, and/or assembly containing storage slots that allows data storage cartridges to be imported (e.g., inserted) into the library, or exported (e.g., removed) from the library, without disrupting host operation and/or without opening a main door to the library. A magazine may provide an environmental barrier for the I/O station (e.g., if an exterior wall of the magazine is adjacent to the exterior of the library).

Figure 12:
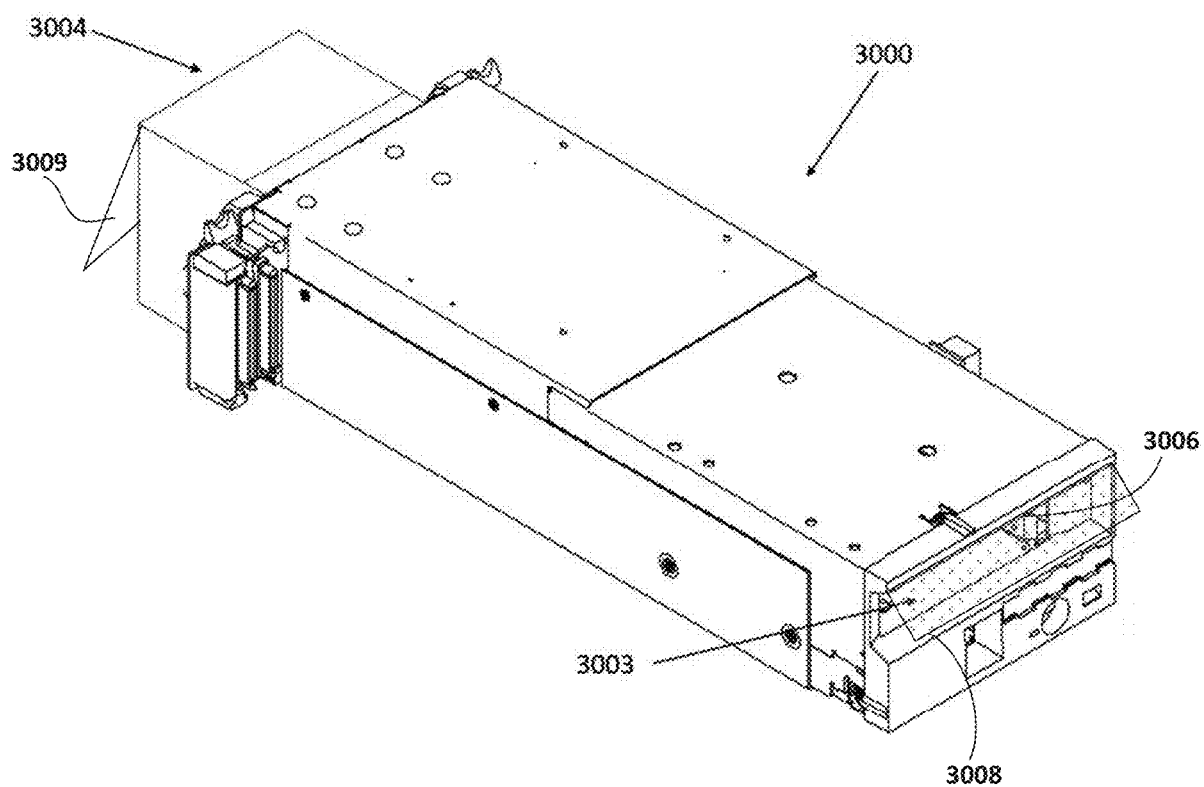
FIG. 12 is a perspective view of one embodiment of a media acclimation device.

Next, referring to FIG. 12, an alternative embodiment of a media acclimation device 3000 is illustrated. Unlike the media acclimation device 2012 that may be associated with and/or integral to at least a portion of the I/O stations 2006, 2007 described above with respect to FIG. 11, media acclimation device 3000 has been modified to fit into an existing data storage drive bay of a library frame, similar to the data storage drives 15 shown in FIG. 2. As media acclimation device 3000 is configured to fit into an existing data storage drive bay, the outer construction of media acclimation device 3000 is substantially similar to that of a conventional data storage drive, such as data storage drive 15. Furthermore, like a conventional data storage drive, media acclimation device 3000 may receive some or all of its power (if necessary) from a hot-swap drive power connector, which provides power to the media acclimation device 3000 via a connection between the data storage drive bay and the media acclimation device.

Media acclimation device 3000 in one aspect is configured to condition the air around one or more data storage cartridges located within the media acclimation device 3000 through the use of a conduit 3004, which provides a connection between the ambient air outside of the data storage library and the interior of media acclimation device 3000. The conduit 3004 may extend toward an opening, baffle, vent, etc. located at the rear of the data storage library, which allows for the selective entry of ambient air from outside the library into the media acclimation device 3000. Additionally or alternatively, the system may use one or more of the environmental devices associated with and/or integrated into the media acclimation device 3000. For example, media acclimation device 3000 may comprise one or more thermoelectric devices that could be used to heat and cool the air inside media acclimation device 3000. Alternatively, any known environmental device, such as an electric heater, a liquid heater, a liquid cooler, an air conditioner, a heat pump, an evaporative cooler, an ionizer, a deionizer, a humidifier, a dehumidifier, one or more fans, etc., or any combination thereof, may be utilized. Media acclimation device 3000 may have an interior configuration and provide for loading of data storage cartridges similar to deep storage slot cell 100 shown and described with respect to FIGS. 7A-7B. Furthermore, media acclimation device 3000 may comprise one or more environmental sensors 3006 associated with, and/or disposed in an interior portion of media acclimation device 3000. The one or more environmental sensors 3006 (e.g., temperature sensor(s), humidity sensor(s), etc.) may be configured to sense the internal environmental conditions of the media acclimation device 3000. The environmental sensor(s) 3006 may be in communication with a library controller, such as controller 400 shown and described with respect to FIG. 4. The communication of any one or all of the environmental sensors may be utilized to control (e.g., adjust) the output and operation of the environmental control device.

In one embodiment, media acclimation device 3000 may contain and acclimate multiple data storage cartridges at the same time. This may be accomplished through deep storage slot technology, similar to that shown and described with respect to FIGS. 7A-7B above, or through a motorized cartridge movement and stacking system, or through some other method. Deep storage slot technology may comprise a spring or other biasing device within the media acclimation device 3000 which provides a biasing force in the opposite direction of data storage cartridge insertion. Multiple data storage cartridges may be inserted and removed without the aid of motors, gravity, etc., due to the biasing force of the spring. Motorized cartridge movement technology may comprise a motorized belt system or similar motorized conveyance, wherein a data storage cartridge may be inserted into one end of the media acclimation device and transported in the direction of the other end of the media acclimation device for eventual removal. Additionally and/or alternatively, a motorized stacking system may be employed, wherein one or more motorized devices may be capable of receiving the data storage cartridges and creating a plurality of stacked rows and/or columns of data storage cartridges within the media acclimation device 3000. Furthermore, the media acclimation device 3000 may be sized to include multiple deep storage slots, multiple belts/conveyors, etc. For instance, instead of only a single row of data storage cartridges stored within the media acclimation device 3000, multiple (e.g., 2, 3, 4, etc.) stored rows may be possible.

In one embodiment, data storage cartridges are inserted by an operator at the conduit 3004 of media acclimation device 3000, and they may be removed by a library robot accessor at the front opening portion 3003 of media acclimation device 3000. In another embodiment, data storage cartridges may be inserted by the library robot accessor at the front opening portion 3003 of media acclimation device 3000 and may be removed by an operator at the conduit 3004 of media acclimation device 3000. The conduit 3004 may be configured to be accessible by the operator via an external access port on the data storage library such that a primary access door to the data storage library does not need to be opened for insertion or removal of data storage cartridges. In another embodiment, data storage cartridges may be inserted by the library robot accessor at the front opening portion 3003 of media acclimation device 3000 and may also be removed by the library robot accessor at the front opening portion 3003 of media acclimation device 3000. In still another embodiment, data media cartridges may be inserted by an operator at the conduit 3004 of media acclimation device 3000 and may be removed by an operator at the conduit 3004 of media acclimation device 3000.

Each of front opening portion 3003 and the conduit 3004 may comprise an environmental barrier to inhibit and/or prevent the entrance and/or escape of air. For example, a door 3008 may be present adjacent to front opening portion 3003, while a door 3009 may be present adjacent an opening of conduit 3004. The environmental barrier (e.g., doors 3008, 3009) may comprise a door, hatch, cover, air curtain, hanging slots or flaps, split membrane, separable membrane, a slot that opens when a cartridge is inserted or removed, or any other method of providing an environmental barrier or seal at an opening to resist, impede, and/or block the intrusion of air into the interior of the media acclimation device 3000. Both doors 3008, 3009 may be movable so as to provide access via an accessor and/or via an operator (e.g., a cartridge moving into or out of the door may cause the environmental seal to be broken while the cartridge is moving into or out of the media acclimation device 3003). The doors 3008, 3009 may be automatically movable (e.g., via movements of the accessor or through an electromechanical device) and/or manually movable by an operator (e.g., if the door is hinged, sliding or otherwise independently operated from a cartridge moving through the door). In an embodiment where data storage cartridge(s) are inserted into the media acclimation device 3000 via the conduit 3004, the door or barrier blocking the rear opening portion may be opened to allow for insertion of the one or more data storage cartridges. The door or barrier may then be closed such that the interior cavity of media acclimation device 3000 may be insulated, separated and/or isolated from both the exterior and interior environments of the data storage library. The environmental control device (or devices) associated with and/or incorporated into the media acclimation device 3000 may then operate to gradually ramp the environmental conditions within the media acclimation device 3000 from the exterior environmental conditions to the interior environmental conditions. In this way, the data storage cartridge(s) within the media acclimation device 3000 gradually acclimatize to the conditions within the data storage library, which may inhibit and/or avoid the formation or accumulation of condensation (or any other undesirable effect that may be caused by changing environments) on any component of the data storage cartridge(s).

As noted above, data storage cartridges may be inserted by the library accessor at the front opening portion 3003 of media acclimation device 3000 and may also be removed by the library accessor at the front opening portion 3003 of media acclimation device 3000. In such an instance, the operator would provide the data storage cartridge(s) at an accessible location (such as an I/O station), and a library accessor would retrieve the cartridge(s) for acclimation and insert them within the media acclimation device 3000. The library accessor would preferably operate at relatively high speeds so as to timely retrieve the data storage cartridge(s) and insert them within the controlled environment of the media acclimation device 3000 so as to inhibit and/or avoid any formation or accumulation of condensation on the data storage cartridge(s) during transport. Alternatively, the accessor may be insulated or may contain an environmental control device (as will be discussed) to help prevent undesirable environmental conditions from affecting the data storage cartridge during transport.

Figure 13:
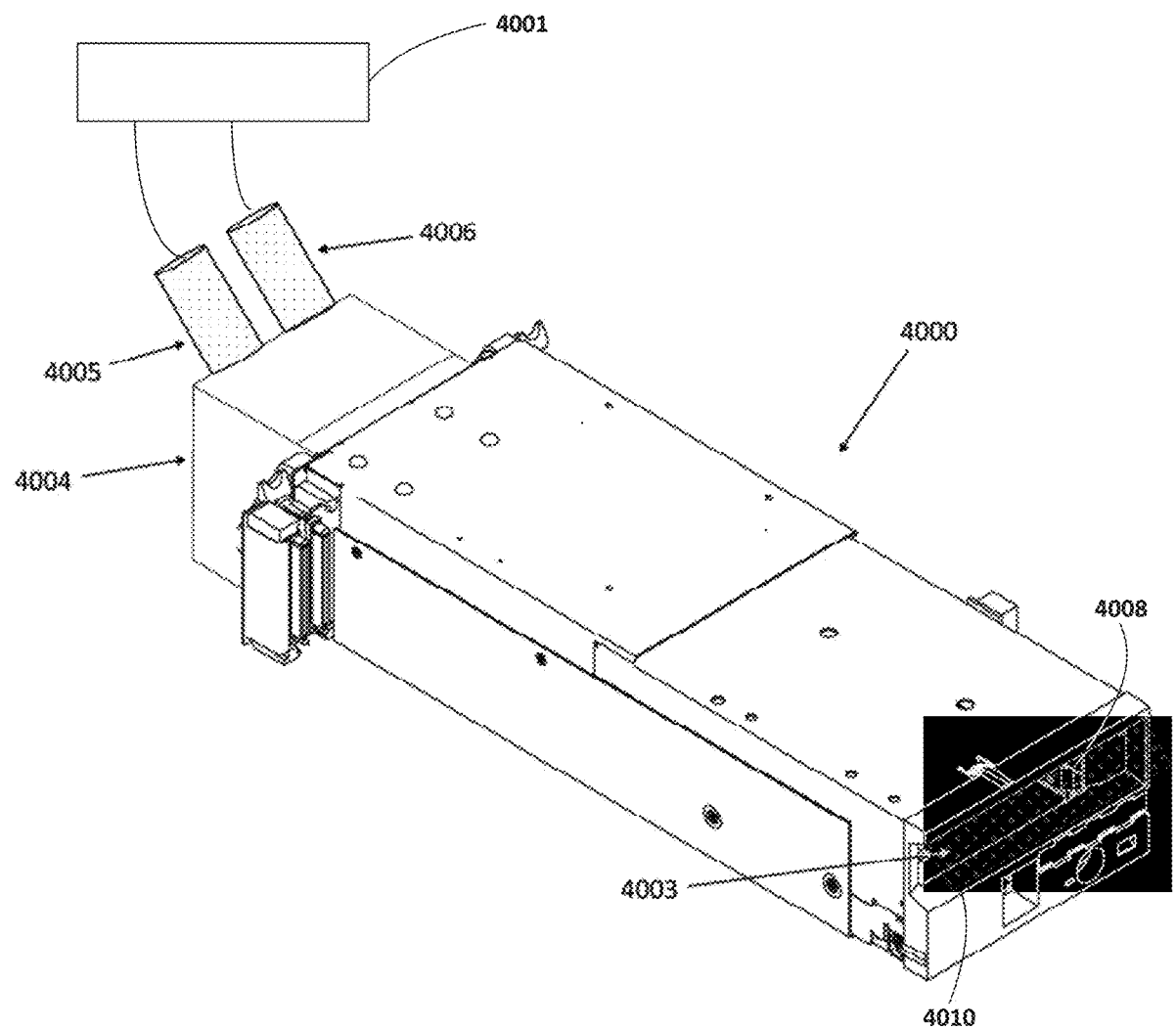
FIG. 13 is a perspective view of another embodiment of a media acclimation device.

Next, referring to FIG. 13, another embodiment of a media acclimation device 4000 is illustrated. Media acclimation device 4000, like media acclimation device 3000 described above with respect to FIG. 12, may be constructed so as to fit into an existing data storage drive bay of a data storage library in a fashion similar to that of a conventional data storage drive, such as data storage drive 15 shown in FIG. 2. Also, like a conventional data storage drive, media acclimation device 4000 may receive some or all of its power (if required) from a hot-swap drive connector.

Media acclimation device 4000 may be configured to condition the air around one or more data storage cartridges disposed therein through the use of one or more of environmental control devices, such as a thermoelectric heater, a thermoelectric cooler, an electric heater, a liquid heater, a liquid cooler, an air conditioner, a heat pump, an evaporative cooler, an ionizer, a deionizer, a humidifier, a dehumidifier, one or more fans, or any combination thereof. Additionally and/or alternatively, media acclimation device 4000 may receive conditioned air from an associated external environmental control component 4001 (e.g., an environmental conditioner such as, for example, an air conditioner or evaporative cooler) through a supply duct 4005. A return duct 4006 may provide a return path for the environmentally conditioned air. However, it is to be understood that return duct 4006 may be omitted from the present embodiment. Furthermore, media acclimation device 4000 may be associated with and/or comprise one or more environmental sensors 4008 disposed within and/or associated with an interior portion thereof. The one or more environmental sensors 4008 (e.g., temperature sensor(s), humidity sensor(s), etc.) may be configured to sense the internal environmental conditions of the media acclimation device 4000. Additionally, or alternatively, optional environmental sensors may be utilized to sense and/or measure the environmental conditions within the interior and/or exterior of data storage library. The environmental sensor(s) 4008 may be in communication with external environmental control component 4001 and/or a library controller, such as controller 400 shown and described with respect to FIG. 4. The communication of the one or more environmental sensors may be utilized to control (e.g., adjust) the output and operation of the environmental control device (e.g., environmental control component 4001, controllable dampers, controllable baffles, etc.).

One or more of supply duct 4005 and return duct 4006 may comprise a damper or baffle to enable the duct to be opened and/or closed. The damper(s) or baffle(s) may be controlled so as to gradually move conditioned air to/from media acclimation device 4000. One respective end of each of supply duct 4005 and return duct 4006 may be connected to the media acclimation device 4000 so as to communicate with an interior portion of media acclimation device 4000, while the other end of supply duct 4005 and return duct 4006 may be coupled to an external environmental control component 4001, such as environmental conditioning unit 1012 shown and described with respect to FIG. 10, which may be, for example, an air conditioning unit. In this way, conditioned air may be provided through duct 4005 to acclimate one or more data storage cartridges placed therein.

In one aspect of the embodiment, media acclimation device 4000 may contain multiple data storage cartridges at the same time. This may be accomplished through deep storage slot technology or through a motorized cartridge movement and stacking system or through some other method, as described above with respect to FIG. 12.

In one aspect of the embodiment, cartridges are inserted by an operator at a rear opening portion 4004 of media acclimation device 4000, and they may be removed by a library robot accessor at the front opening portion 4003 of media acclimation device 4000. In another embodiment, data storage cartridges may be inserted by the library robot accessor at the front opening portion 4003 of media acclimation device 4000 and may be removed by an operator at the rear opening portion 4004 of media acclimation device 4000. The rear opening portion 4004 may be configured to be accessible by the operator via an external access port, panel and/or door on the data storage library such that a primary access door to the data storage library (which is typically much larger than the access port) does not need to be opened for insertion or removal of data storage cartridges. In at least one embodiment supply duct 4005 and/or return duct 4006 preferably does not interfere with access to the rear opening portion 4004.

In another embodiment, data storage cartridges may be inserted by the library robot accessor at the front opening portion 4003 of media acclimation device 4000 and may also be removed by the library robot accessor at the front opening portion 4003 of media acclimation device 4000. In still another embodiment, data storage cartridges may be inserted by an operator at the rear opening portion 4004 of media acclimation device 4000 and may be removed by an operator at the rear opening portion 4004 of media acclimation device 4000.

Front opening portion 4003 and rear opening portion 4004 may comprise an environmental barrier to prevent the entrance and/or escape of air. For example, front opening portion 4003 may comprise a door 4010, which is capable of moving so as to enable access to the interior of media acclimation device 4000. While not shown, rear opening portion 4004 may comprise a similar environmental barrier. If present, the environmental barrier of rear opening portion 4004 and/or front opening portion 4003 may comprise a door, hatch, cover, air curtain, hanging slots or flaps, split membrane, separable membrane, a slot that opens when a cartridge is inserted or removed, or any other method of providing an environmental barrier or seal at an opening to resist, impede, and/or block air from intruding into the interior of the media acclimation device 4000. In an embodiment where data storage cartridge(s) are inserted into the media acclimation device 4000 via the rear opening portion 4004, the door or barrier blocking the rear opening portion may be opened to allow for insertion of the one or more data storage cartridges. The door or barrier may then be closed such that the interior cavity of media acclimation device 4000 may be insulated, separated, and/or isolated from both the exterior and interior environments of the data storage library. Conditioned air from an associated external environmental control component 4001 (e.g., an environmental conditioning unit, such as, for example, an air conditioner or evaporative cooler) may then be provided through a supply duct 4005 into the media acclimation device 4000 to gradually ramp the environmental conditions within the media acclimation device 4000 from the exterior environmental conditions to the interior environmental conditions. In this way, the data storage cartridge(s) within the media acclimation device 4000 gradually acclimatize to the conditions within the data storage library, which may inhibit and/or avoid the formation or accumulation of condensation (or any other undesirable effect that may be caused by changing environments) on any component of the data storage cartridge(s).

Figure 14:
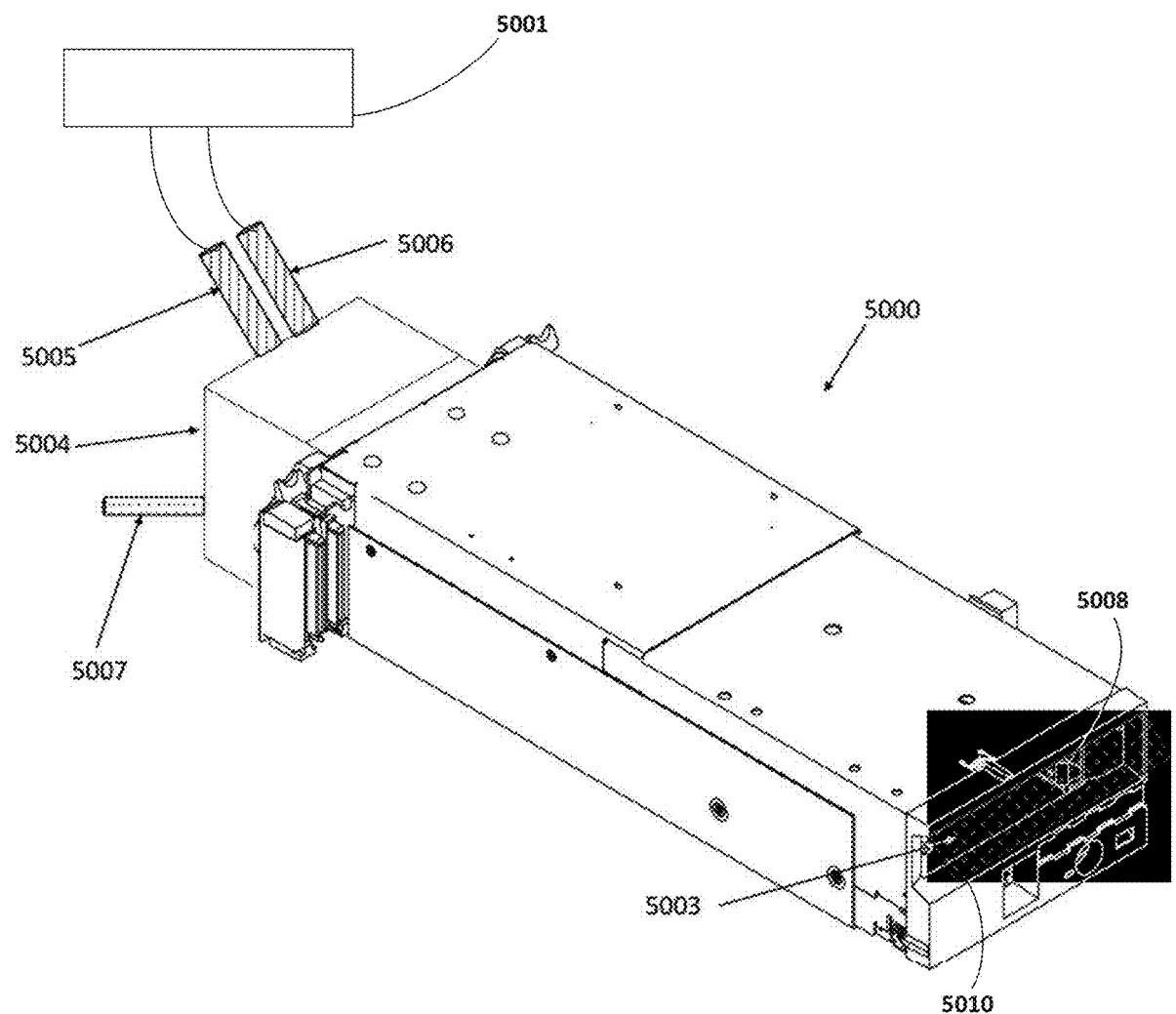
FIG. 14 is a perspective view of yet another embodiment of a media acclimation device.

Next, referring to FIG. 14, another alternative embodiment of a media acclimation device 5000 is illustrated. Media acclimation device 5000, like media acclimation devices 3000, 4000 described above with respect to FIG. 12 and FIG. 13, respectively, may be constructed so as to fit into an existing data storage drive bay of a data storage library in a fashion similar to that of a conventional data storage drive, such as data storage drive 15 shown in FIG. 2. Also, like a conventional data storage drive, media acclimation device 5000 may receive some or all of its power (if required) from a hot-swap drive connector.

Media acclimation device 5000 is configured to condition the air around one or more data storage cartridges disposed therein through the use of one or more of the environmental control devices, such as the environmental control devices described above with respect to media acclimation devices 3000, 4000. Additionally, and/or alternatively, media acclimation device 5000 may receive heated or cooled liquid from an associated external environmental control component 5001 (e.g., refrigerant from an air conditioner compressor, cold water from an evaporative cooler, hot water from a water heater, etc.) via a supply line 5005, while heated or cooled liquid may return to the external component via a return line 5006. A condensate drain line 5007 may also be incorporated so as to drain any condensation from the system. In this way, the environmental conditions within the interior of media acclimation device 5000 may be gradually changed so as to acclimate one or more data storage cartridges stored therein. Furthermore, media acclimation device 5000 may comprise one or more environmental sensors 5008 associated with the media acclimation device 5000 and/or disposed in at an interior portion thereof. The one or more environmental sensors 5008 (e.g., temperature sensor(s), humidity sensor(s), etc.) may be configured to sense the internal environmental conditions of the media acclimation device 5000. Additionally, or alternatively, optional environmental sensors may be utilized to sense and/or measure the environmental conditions within the interior and/or exterior of the data storage library. The environmental sensor(s) 5008 may be in communication with external environmental control component 5001 and/or a library controller, such as controller 400 shown and described with respect to FIG. 4. The communication of the one or more environmental sensors may be utilized to control (e.g., adjust) the output and operation of the environmental control device (e.g., external environmental control component 5001).

In one aspect of the embodiment, media acclimation device 5000 may contain multiple data storage cartridges at the same time. This may be accomplished through deep storage slot technology or through a motorized cartridge movement and stacking system or through some other method, as described above with respect to FIG. 12.

Cartridges may be inserted and removed from of media acclimation device 5000 through openings in the manner(s) described with respect to media acclimation devices 3000 or 4000 described in FIGS. 12 and 13. In addition, front opening portion 5003 and rear opening portion 5004 may each comprise an environmental barrier to inhibit and/or prevent the entrance and/or escape of air from the media acclimation device 5000 similar to the media acclimation devices 3000 and 4000 described in connection with FIGS. 12 and 13. For example, front opening portion 5003 may comprise a door 5010, which is capable of moving so as to enable access to the interior of media acclimation device 5000. While not shown, rear opening portion 5004 may comprise a similar door. In an embodiment where data storage cartridge(s) are inserted into the media acclimation device 5000 via the rear opening portion 5004, the door or barrier blocking the rear opening portion may be opened to allow for insertion of the one or more data storage cartridges. The door or barrier may then be closed such that the interior cavity of media acclimation device 5000 may be isolated from both the exterior and interior environments of the data storage library. Heated or cooled liquid may then be provided through a supply line 5005 into the media acclimation device 5000 to gradually ramp the environmental conditions within the media acclimation device 5000 from the environmental conditions exterior to the data storage library to the environmental conditions within the data storage library. In this way, the data storage cartridge(s) within the media acclimation device 5000 may gradually acclimatize to the conditions within the data storage library, which may inhibit and/or avoid the formation and/or accumulation of condensation (or any other undesirable effect that may be caused by changing environments) on any component of the data storage cartridge(s).

Referring now to FIG. 15, another embodiment in accordance with the present disclosure is illustrated. A library frame 6000 comprises an access front panel 6017 having a rear-facing portion of an operator panel 6002, an accessor 6004, and a gripper cage 6005, which may be associated with and/or connected to a part of accessor 6004. The front panel 6017 may also include I/O station 6016, 6018. The gripper cage 6005 includes an upper gripper 6006 and a lower gripper 6007. As described above with respect to FIG. 2, the gripper cage 6005 acts to physically retain one or more data storage cartridges for delivery to various locations within the library frame 6000. The library frame 6000 further comprises a cross-rail 6008, upon which the accessor 6004 may travel, as well as an accessor controller 6009.

In an aspect of the embodiment shown in FIG. 15, the accessor 6004 may comprise a media acclimation device. For example, the gripper cage 6005 may be sized so as to form at least a partially enclosed region around the upper gripper 6006 and lower gripper 6007. The environmental conditions within the partially enclosed region of gripper 6005 may be altered via, one or more environmental control devices, e.g., a thermoelectric heater, a thermoelectric cooler, an electric heater, a liquid heater, a liquid cooler, an air conditioner, a heat pump, an evaporative cooler, an ionizer, a deionizer, a humidifier, a dehumidifier, one or more fans, or any combination thereof, to provide environmental conditions different than those within the library frame 6000. A moveable door, split membrane or other environmental barrier (e.g., hanging slots, an air curtain, etc.) may be located at an access opening of the gripper cage 6005 so as to enable the upper gripper 6006 and lower gripper 6007 to pass therethrough when retrieving and/or delivering a data storage cartridge, while still inhibiting and/or preventing the environmental conditions within the gripper cage from being influenced by the environmental conditions within the library frame 6000. In this way, the data storage cartridge(s) retrieved by accessor 6004 may be acclimated, or their environment maintained during transport, within the accessor 6004 itself. Alternatively, upper gripper 6006 and/or lower gripper 6007 may comprise the acclimation device. In this case, the environmental barrier may be at the front of the gripper where cartridges would be drawn into the gripper.

FIGS. 11-15 illustrate a variety of alternative media acclimation devices which may individually operate so as to gradually acclimate data storage cartridges being inserted into (or removed from) a data storage library. However, it is to be understood that the various media acclimation devices described above may be combined so as to provide a system-wide acclimation solution. For example, an I/O station media acclimation device (such as that shown and described with respect to FIG. 11) may be used to receive a data storage cartridge and begin the acclimation process either by slowly changing the environment of the data storage cartridge or by maintaining the environment of the data storage cartridge. A robotic accessor having an integrated media acclimation device (such as that shown and described with respect to FIG. 15) may then retrieve the data storage cartridge from the I/O station and continue the acclimation process either by slowly changing the environment of the data storage cartridge or by maintaining the environment of the data storage cartridge during transport. Finally, a storage slot media acclimation device (described earlier) and/or data storage drive bay media acclimation device (such as those shown and described with respect to FIGS. 12-14) may receive the data storage cartridge(s) from the accessor so as to complete the acclimation process. In this way, the acclimation process may start when the data storage cartridge enters the I/O station and the acclimation process may be completed as the data storage cartridge migrates to the final media acclimation device.

Furthermore, in any of the embodiments shown and described earlier and also with respect to FIGS. 11-15, one or more environmental sensors (e.g., temperature sensor(s), humidity sensor(s), etc.) may be associated with, and/or disposed within, upon, or adjacent to the media acclimation device(s); associated with, and/or disposed within, upon, or adjacent to the data storage library; and/or associated with and/or disposed within, upon, or adjacent to any external component, or exterior to the data storage library. These environmental sensors may be used for monitoring and/or control of an acclimation process. The monitoring and/or control of the media acclimation process may be performed by the media acclimation device(s), an external environmental control component associated with the media acclimation device(s), an environmental control device, a data storage library controller, or another control system. Accordingly, the data storage cartridge(s) or other components within the media acclimation device(s) may be properly acclimatized prior to insertion or removal from the interior confines of the data storage library.

The processes described herein may be performed utilizing one or more embodiments of the media acclimation devices described herein or by any other media acclimation devices, including media acclimation devices that are not disclosed herein. In one embodiment of the method of acclimating one or more components for insertion into or removal from a data storage library, the components are inserted into an acclimation device, such as, for example, the media acclimation device shown and described above in FIGS. 1-15, or other undisclosed acclimation device, at first environmental conditions. Both the acclimation device and the components inserted into the acclimation are preferably at the same first environmental conditions, for example, the same temperature and/or humidity level. However, there may be a temperature and/or humidity differential between the interior of the acclimation device and components inserted into the acclimation device. The interior of the acclimation device and the components inserted therein are acclimated to second environmental condition(s). For example, the temperature and/or humidity levels at first environmental conditions may be different than the temperature and/or humidity levels at the second environmental conditions. And, the components are removed from the acclimation device. In one embodiment, the components may be inserted into the device and held in the acclimation device for a sufficient period of time to acclimate to the second environmental conditions. The time period may be a predetermined time period, for example, twenty-four (24) hours. The predetermined time period preferably is sufficient to permit the components to sufficiently acclimate. The amount of time provided to acclimate may be more or less then twenty-four (24) hours.

The time period could also vary and be set depending upon the environmental conditions between the various environments (e.g., inside and outside the library). For example, the amount of time that is provided to acclimate the components in the acclimation device may depend upon the interior conditions inside the library, the exterior conditions outside the library and/or both. A look-up table could be used or calculations performed to determine the amount of time the component(s) stay inside the acclimation device before they are removed. Sensors may be employed to measure the conditions inside and outside the library. In another aspect, the process may involve including data on the interior conditions inside the acclimation device. Again sensors may be employed to measure conditions within the interior of the acclimation device.

In embodiments, the acclimation device may be acclimated so that interior is at the desired environmental conditions, e.g., at or close to the exterior library conditions, or at or close to the interior library conditions. To acclimate the acclimation device to desired conditions before the components are inserted within the acclimation device, the acclimation device may be arranged in a desired configuration that favors acclimation for a predetermined period of time. For example, the acclimation device may set for about twenty-four (24) hours before the components are inserted into the acclimation device. In alternative embodiments, sensors may be employed to set the amount of time that the acclimation device is acclimated.

In other embodiments, measurements of environmental conditions are made and/or calculated, including comparisons of measurements, to determine whether or not environmental conditions are at, near or within a desired range and/or threshold of a desired environmental condition. In one aspect, one or more sensors may be used to make the measurements, and a processor and/or controller including library processors and/or controllers may be utilized.

Figure 16:
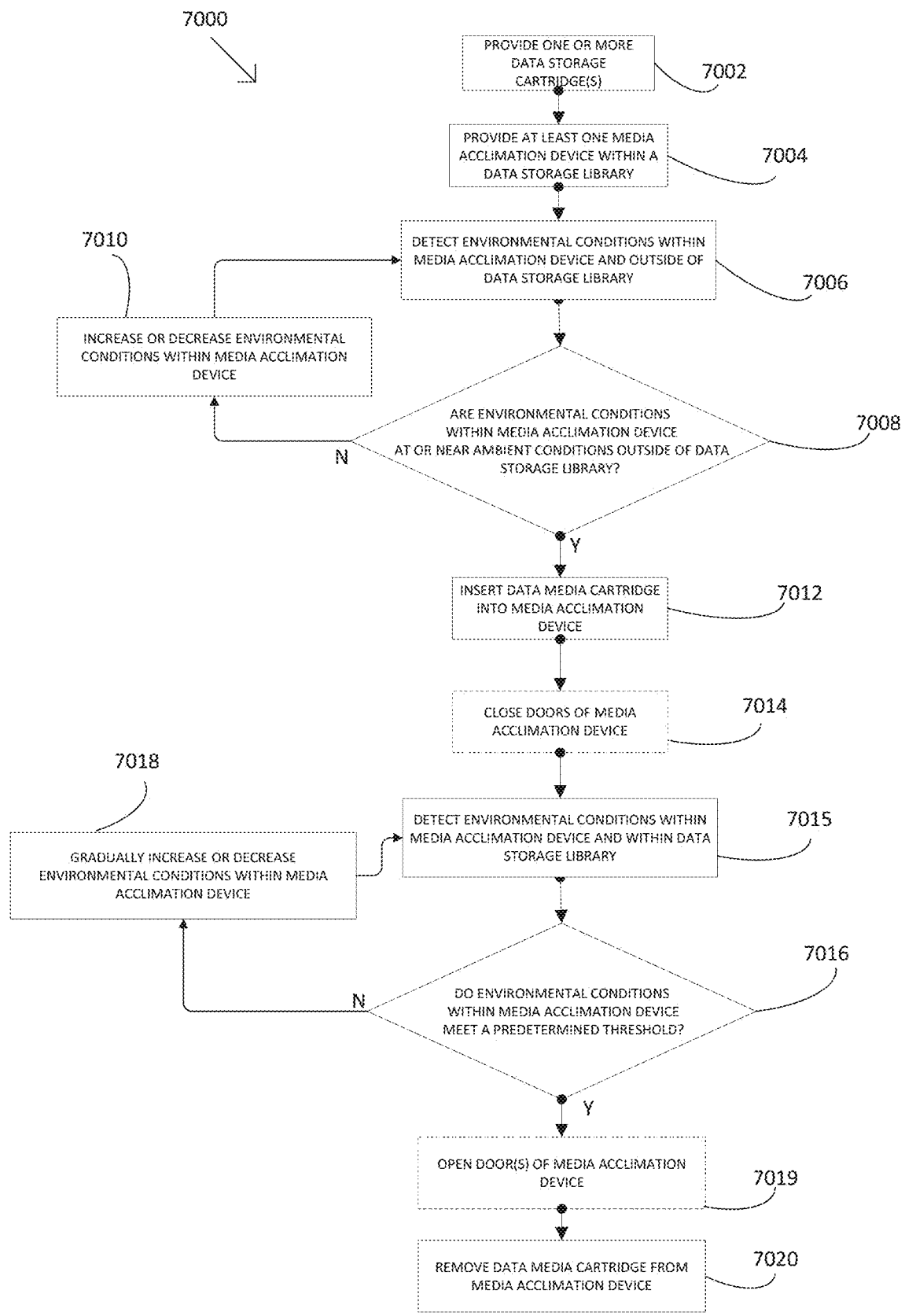
FIG. 16 is a flowchart of one embodiment of a method for acclimating at least one data storage cartridge.

Referring to FIG. 16, a media acclimation process 7000, for example, to acclimate one or more data storage cartridges from ambient conditions outside a data storage library to environmental conditions within the interior of a data storage library, is disclosed in accordance with one aspect of the present disclosure. While media acclimation process 7000 may be considered for the sake of convenience and not with the intent of limiting the disclosure as comprising a series and/or number of steps, it is to be understood that the process does not need to be performed as a series of steps and/or the steps do not need to be performed in the order shown and described with respect to FIG. 16. At 7002, one or more data storage cartridges are provided, while at least one media acclimation device is provided at 7004. The at least one media acclimation device may be any media acclimation device, including, but not limited to, those described above with respect to FIGS. 11-15. The media acclimation device may be configured and arranged to provide environmental conditions that may be different, distinct, separated, insulated and/or isolated from the environmental conditions of the interior of the data storage library and/or exterior of the data storage library, e.g. the room or facility in which the data storage library is located.

Next, at 7006, one or more desired environmental condition(s) (e.g., the temperature and/or humidity levels) both within the media acclimation device and outside the data storage library are detected and/or determined. The desired one or more environmental conditions may be any environmental condition (e.g., temperature, humidity, containments level, and/or ionization level, etc.) which may be beneficial or advantageous to gradually adjust to inhibit, impede, or resist adverse effects as the data storage cartridge and/or its associated media are transferred and/or transported from one environment to a different environment (e.g., outside the data storage library to inside the data storage library). The desired environmental conditions (e.g., temperature and/or humidity) may be detected and determined in a number of ways, including, for example, using one or more sensors associated with the media acclimation device, which are configured to measure the desired environmental condition(s) in the interior of the media acclimation device, and one or more sensors configured to measure the corresponding desired environmental condition(s) outside of the data storage library.

At 7008, it is determined whether the desired environmental condition(s) (e.g., temperature and/or humidity) within the media acclimation device is at, near and/or within a range or threshold of the desired corresponding ambient environmental condition(s) outside of the data storage library. This determining step may be performed by comparing the data measured and/or detected for the corresponding environmental condition(s) (e.g., the temperature and/or humidity) within the media acclimation device to the environmental condition(s) outside the data storage library. While 7006 and 7008 are shown and described separately it will be appreciated that those processes may be combined or performed simultaneously, for example, in the controller or computer processing unit of the data storage library.

If the desired environmental condition(s) within the media acclimation device are not at, near, approximate of, and/or within a range or a determined threshold of the environmental condition(s) outside the data storage library, the desired environmental condition(s) (e.g., temperature and/or humidity) within the media acclimation may be increased or decreased at 7010. The desired environmental condition(s) being detected, measured and/or compared may be increased or decreased either through passive exchange with the ambient external environmental conditions or the interior library environmental conditions, or through an active change via one or more environmental control devices associated with the media acclimation device and/or the environmental conditioning unit used for the data storage library. In one embodiment, a predetermined time may pass in order to permit the conditions inside the media acclimation device to approximate the conditions outside the data storage library, and then measurements, comparisons and/or determinations are undertaken again. Alternatively, ducts, baffles, ports, openings, and/or vents (herein referred to as vents) to the media acclimation device in communication with the exterior of the library may be opened (e.g., a door, baffle and/or barrier blocking the duct, port, vent or opening may be moved or an air curtain may be deactivated) to equalize conditions between the interior of the media acclimation device and the exterior of the data storage library, and/or in alternative embodiments, ducts and/or vents in communication with the interior of the data storage device may be unblocked or opened. Additionally or alternatively, environmental control devices may be activated to equalize the desired environmental conditions inside the media acclimation device and the exterior of the data storage library. The processes at 7006, 7008 and 7010 are repeated until it is determined that the desired environmental condition(s) (e.g., temperature and/or humidity) inside the media acclimation device are at or near the environmental condition(s) (e.g. temperature and/or humidity) outside the data storage library, and in response thereto a data media cartridge (or cartridges) may be inserted into the media acclimation device at 7012. If the media acclimation device comprises one or more doors, the one or more doors of the media acclimation device may be closed at 7014 in order to insulate, separate, and/or isolate the interior of the media acclimation device. It is to be noted that in some embodiments, media acclimation device may not utilize doors or other physical barriers, and thus 7014 may be omitted.

At 7015, the environmental condition(s) (e.g., temperature and/or humidity) of the interior of the data storage library and within the media acclimation device are then detected by, for example, sensors (e.g., temperature and/or humidity sensors). Next, at 7016, the desired environmental condition(s) (e.g., temperature and/or humidity levels) within the media acclimation device are compared to the corresponding desired environmental condition(s) (e.g., temperature and/or humidity levels) inside the library, and a determination is made whether or not the environmental condition(s) (e.g., temperature and/or humidity) within the media acclimation device meet a desired threshold difference, preferably a predetermined threshold difference, with the environmental condition(s) (e.g., temperature and/or humidity) within the library. If the desired environmental condition(s) inside the library do not meet the threshold difference, are different than, and/or are not within a desired range of, the corresponding environmental condition(s) inside the media acclimation device, the desired environmental condition(s) (e.g., temperature and/or humidity levels) within the media acclimation device are gradually increased or decreased at 7018. The desired environmental condition(s) (e.g. temperature and/or humidity levels) may be increased and/or decreased via any environmental control devices, including those described above with respect to FIGS. 11-15, or simply through passive exposure to the ambient air inside of and/or outside of the data storage library.

Processes 7015, 7016, and 7018 are repeated until the desired environmental condition(s) (e.g., the temperature and/or humidity levels) within the media acclimation device meet the desired threshold difference, preferably the predetermined threshold difference, at which point the media acclimation process is complete. If the media acclimation device comprises one or more doors or other physical barriers, the door(s) or barriers may be opened at 7019, and the data storage cartridge may be removed from the media acclimation device at 7020. It is to be noted that in some embodiments, media acclimation device may not utilize doors or other physical barriers, and thus 7019 may be omitted. It should be understood that the threshold difference can be reached when the corresponding environmental condition(s) (e.g., temperature and/or humidity) being measured and/or compared are close, approximate of, at and or within a range as may be appropriate depending upon the environmental conditions that exist inside and outside of the data storage library. During the acclimation process 7000, or other acclimation processes described herein, air curtains, movable doors and/or other environmental barriers associated with openings in communication with the interior of the data storage library and/or moveable doors and/or barriers associated with openings in communication with the outside of the data storage library may be activated, deactivated, opened and/or closed as appropriate to permit or inhibit exposure of the media acclimation device to the environmental conditions of the interior or exterior of the data storage unit, or as appropriate to permit access between the media acclimation device and the interior and exterior of the data storage library to import or export data storage cartridges.

Figure 17:
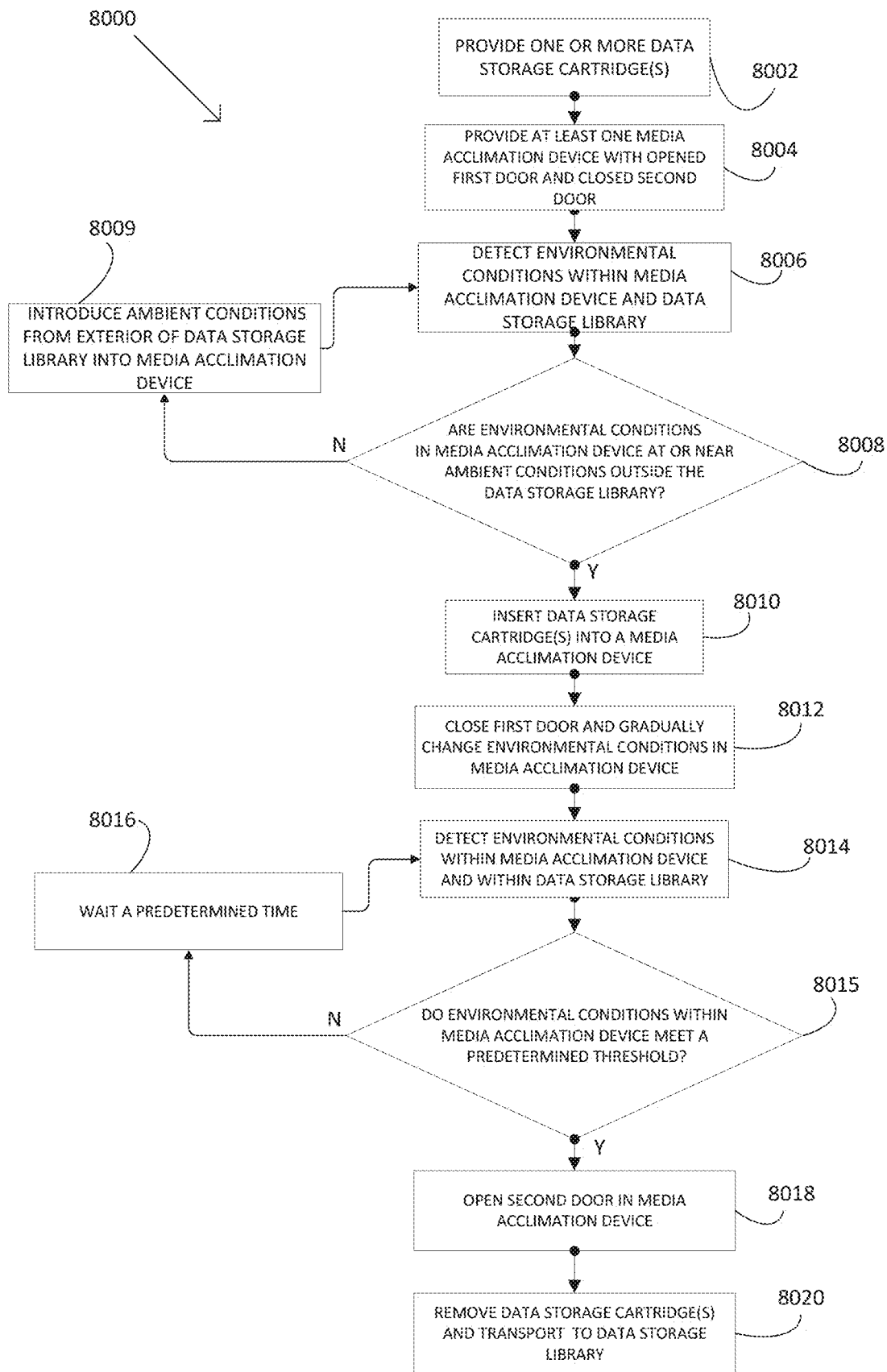
FIG. 17 is a flowchart of another embodiment of a method for acclimating at least one data storage cartridge.

Referring now to FIG. 17, media acclimation process 8000, for example, to acclimate one or more data storage cartridges from ambient conditions outside a data storage library to environmental conditions within the interior of a data storage library, is disclosed in accordance with another aspect of the present disclosure. While media acclimation process 8000 may be considered for the sake of convenience and not with an intent of limiting the disclosure as comprising a series and/or a number of steps, it is to be understood that the process does not need to be performed as a series of steps and/or the steps do not need to be performed in the order shown and described with respect to FIG. 17. At 8002, one or more data storage cartridges are provided, while at least one media acclimation device is provided at 8004. A first door of the media acclimation device may be in an opened or partially opened position so as not to inhibit or block an opening that is in environmental communication with the exterior of the data storage library, while a second door of the media acclimation device may be in a closed position to restrict, inhibit and/or block an opening in communication with the interior of the data storage library. In one embodiment, the at least one media acclimation device is preferably a passive media acclimation device, such as, for example, the passive media acclimation device embodiment which is shown and described above with respect to FIGS. 11-12. Thus, the media acclimation device provided in 8004 is preferably acclimated via exposure to and reliance on conductive and convective heat transfer and/or passive connection(s) to the ambient environmental conditions outside the data storage library and/or environmental conditions within the data storage library.

At 8006, desired environmental condition(s) (e.g., temperature and/or humidity) are detected inside the media acclimation device and outside the data storage library. The desired environmental conditions may be detected through a number of means, including, for example, the use of sensors for measuring the desired environmental condition(s) (e.g., temperature and/or humidity) inside the media acclimation device and outside the data storage library. At 8008, it is determined whether or not the desired environmental condition(s) inside the media acclimation device is at, near, and/or within a range or threshold of the corresponding ambient environmental condition(s) outside the library. Such a determination may be made by taking measurements or readings via, e.g., one or more environmental sensors such as temperature sensor(s) and/or humidity sensor(s) within the media acclimation device, and environmental sensors exterior to the data storage library and comparing the corresponding measured environmental condition data.

If at 8008 the desired environmental condition(s) within the media acclimation device are not at, near, and/or within a range or threshold of the corresponding ambient environmental condition(s), then ambient conditions from the external environment outside of the data storage library are introduced into the media acclimation device at 8009. In an alternative embodiment, a period of time is permitted to pass before measurements and comparisons are retaken again at 8006 and 8008. Additionally, and/or alternatively, one or more ports, baffles, vents, ducts, doors and/or openings communicating between the media acclimation device and the exterior of the data storage library may be unblocked or opened further (e.g., a barrier, baffle or door may be moved more to an open position, an air curtain may be partially or fully deactivated, etc.) to permit the media acclimation device to adjust to the exterior conditions outside the data storage library. However, if yes, the desired environmental conditions within the media acclimation are at, near, and/or within a desired range of the environmental conditions outside or exterior to the data storage library, the data storage cartridge(s) may be inserted into the media acclimation device at 8010.

Next, at 8012, the first door of the media acclimation device may be closed after insertion of the data storage cartridge(s). Closure of the first door preferably isolates, insulates, and/or separates the interior of the media acclimation device from the ambient conditions outside the data storage library, and may permit the environmental conditions within the media acclimation device to gradually ramp towards the environmental conditions within the interior of the data storage library. Additionally and/or alternatively, ambient air and/or conditioned air from within the data storage library may be introduced into the media acclimation device via openings, baffles, ducts, vents, etc., between the media acclimation device and the interior of the data storage library so as to speed or slow the media acclimation process. The ducts, opening, vents, etc. may have moveable doors, air curtains or barriers to permit selective use of the ducts, openings and/or vents. At 8014, the environmental condition(s) within the media acclimation device are again detected, as are the environmental condition(s) within the storage library, and it is determined, at 8015, whether or not the environmental condition(s) within the media acclimation device are at, near, and/or within a range or threshold difference between the environmental condition(s) inside the media acclimation device and the environmental condition(s) inside the data storage library.

If no, then a predetermined amount of time is allowed to pass so as to allow the environmental condition(s) within the media acclimation device to change at 8016. Processes 8014, 8015 and 8016 are repeated until the environmental condition(s) within the media acclimation device are at, near, and/or within a range or threshold of the corresponding desired environmental condition(s) inside the data storage library. If yes, the environmental condition(s) inside the media acclimation device and inside the library are within the desired threshold (e.g., at, near and/or within a desired range), then a second door in the media acclimation device may be opened so as to provide internal access to the data storage cartridge(s) within the data storage library at 8018. The properly-acclimated data storage cartridge(s) may then be removed from the media acclimation device and transported to the appropriate location within the data storage library at 8020.

Figure 18:
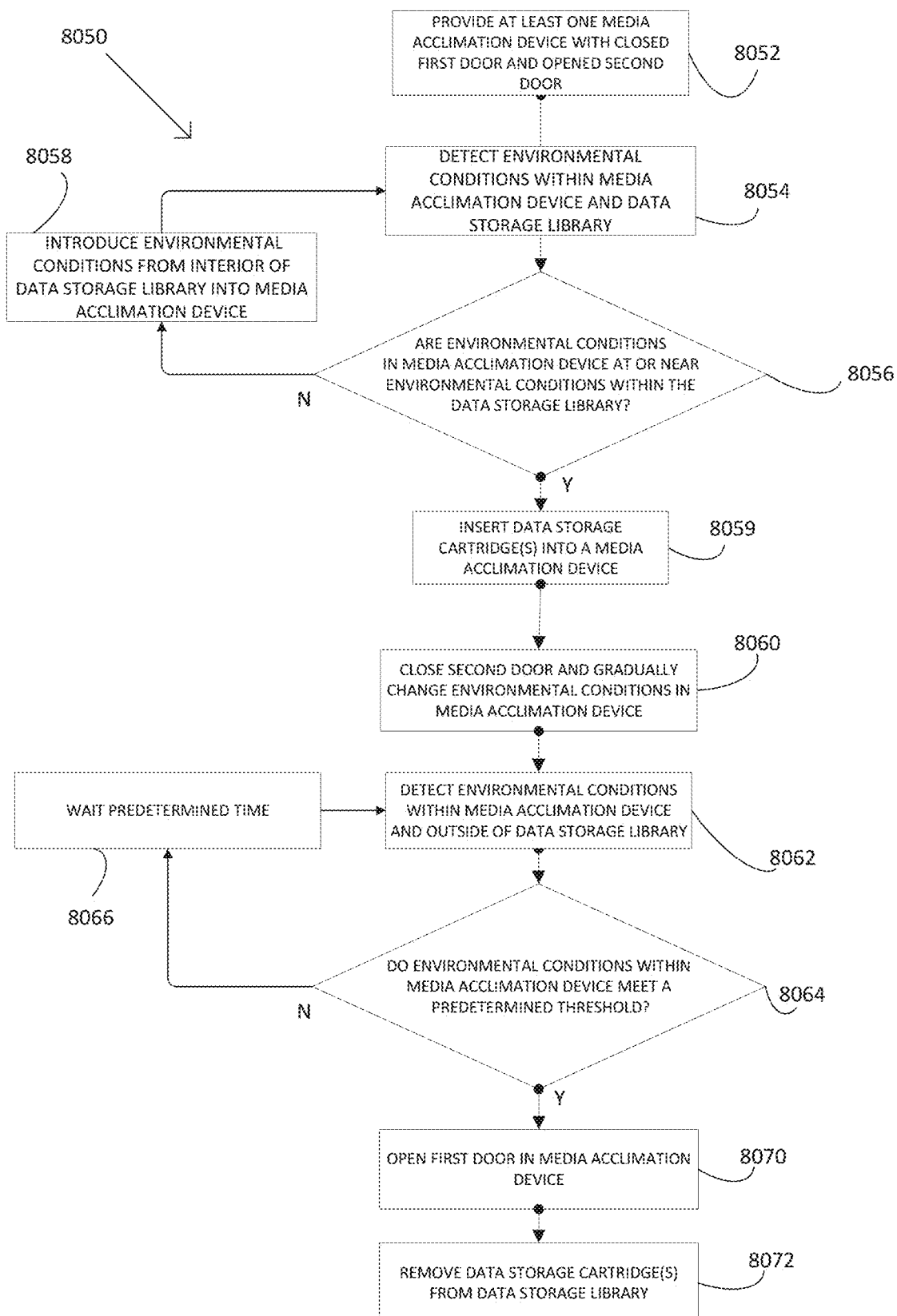
FIG. 18 is a flowchart of another embodiment of a method for acclimating at least one data storage cartridge.

FIG. 18 discloses a media acclimation process 8050 similar to process 8000 described above with respect to FIG. 17, but designed for the removal of data storage cartridge(s) from a data storage library. Again, while media acclimation process 8050 may be considered for the sake of convenience and without an intent of limiting the disclosure as a series and/or a number of steps, it is to be understood that the process does not need to be performed as a series of steps and/or the steps do not need to be performed in the order shown and described with respect to FIG. 18. At 8052, a first door of the media acclimation device may be in a closed position to restrict and/or block an opening in communication with the exterior of the data storage library, while a second door of the media acclimation device may be in an opened or partially opened position so as not to block and/or restrict an opening that is in communication with the interior of the data storage library. Thus, the media acclimation device provided in 8052 is preferably acclimated by exposure to and/or via passive connection(s) to the environmental conditions within the interior of the data storage library. At 8054, one or more environmental condition(s) within the media acclimation device and within the data storage library are detected and/or measured. Such measurement(s) may be made via, e.g., one or more environmental sensors such as, for example, temperature sensor(s) and/or humidity sensor(s) within the media acclimation device, and corresponding environmental sensors within the data storage library. At 8056, it is determined whether or not the media acclimation device is at or near the environmental conditions within the library. Such a determination may be made by comparing corresponding readings from the one or more environmental sensors such as, for example, temperature sensor(s) and/or humidity sensor(s) within the media acclimation device, and corresponding environmental sensors within the data storage library.

If at 8056 it is determined that the desired environmental condition(s) within the media acclimation device are not at, near and/or within the desired range or threshold of the corresponding environmental condition(s) inside the library, then in one embodiment environmental conditions from within the data storage library are introduced into the media acclimation device at 8058. For example, one or more ports, doors, baffles, vents or openings communicating between the media acclimation device and the interior of the data storage library may be partially or fully unblocked or partially or fully opened (e.g., a barrier or door may be moved to an open or partially open position, an air curtain may be fully or partially deactivated, etc.) to permit the media acclimation device to adjust to the interior conditions outside the data storage library. Alternatively, and/or additionally, a period of time can elapse to permit the media acclimation device greater exposure to the environmental conditions within the data storage library, and/or active environmental control devices (e.g., one or more fans, thermoelectric devices, etc.), and/or environmental conditioning units may be utilized to alter the desired environmental conditions within the media acclimation device. Processes 8054, 8056 and 8058 are repeated until, yes at 8056 the desired environmental conditions within the media acclimation are at or within a desired range of the environmental condition(s) within the data storage library, then data storage cartridge(s) may be inserted into the media acclimation device at 8059.

Next, at 8060, with the insertion of the data storage cartridge(s), the second door of the media acclimation device may be closed. Closure of the second door preferably isolates, insulates, and/or separates the interior of the media acclimation device from environmental conditions within the data storage library, and may permit the environmental conditions within the media acclimation device to gradually ramp towards the environmental conditions outside of the data storage library. Additionally and/or alternatively, ambient air from outside of the data storage library may be introduced and/or passively communicated into the media acclimation device via ducts, doors, vents, baffles, ports, openings, etc., in the media acclimation device in communication with the exterior of the data storage library, which may have air curtains, moveable doors and/or other environmental barriers to permit direct exposure to environmental conditions outside the data storage library so as to speed up or slow down the media acclimation process. At 8062, the environmental conditions within the media acclimation device are again detected, as are the environmental conditions outside of the storage library, and it is determined, at 8064, whether or not the environmental conditions within the media acclimation device are at, near, and/or within a range or threshold difference between the conditions outside of the data storage library. If the environmental conditions in the media acclimation device do not meet the requirements (e.g., within defined and/or desired threshold), a predetermined amount of time is allowed to pass so as to allow the environmental conditions within the media acclimation device to change at 8066. Processes 8062, 8064 and 8066 are repeated until yes, the desired environmental condition(s) within the media acclimation device meet the requirements (e.g., within the defined and/or desired threshold), then a first door in the media acclimation device may be opened so as to provide external access to the data storage cartridge(s) from outside of the data storage library at 8070. The properly-acclimated data storage cartridge(s) may then be removed from the media acclimation device and transported from the data storage library and into the data center at 8072.

Figure 19:
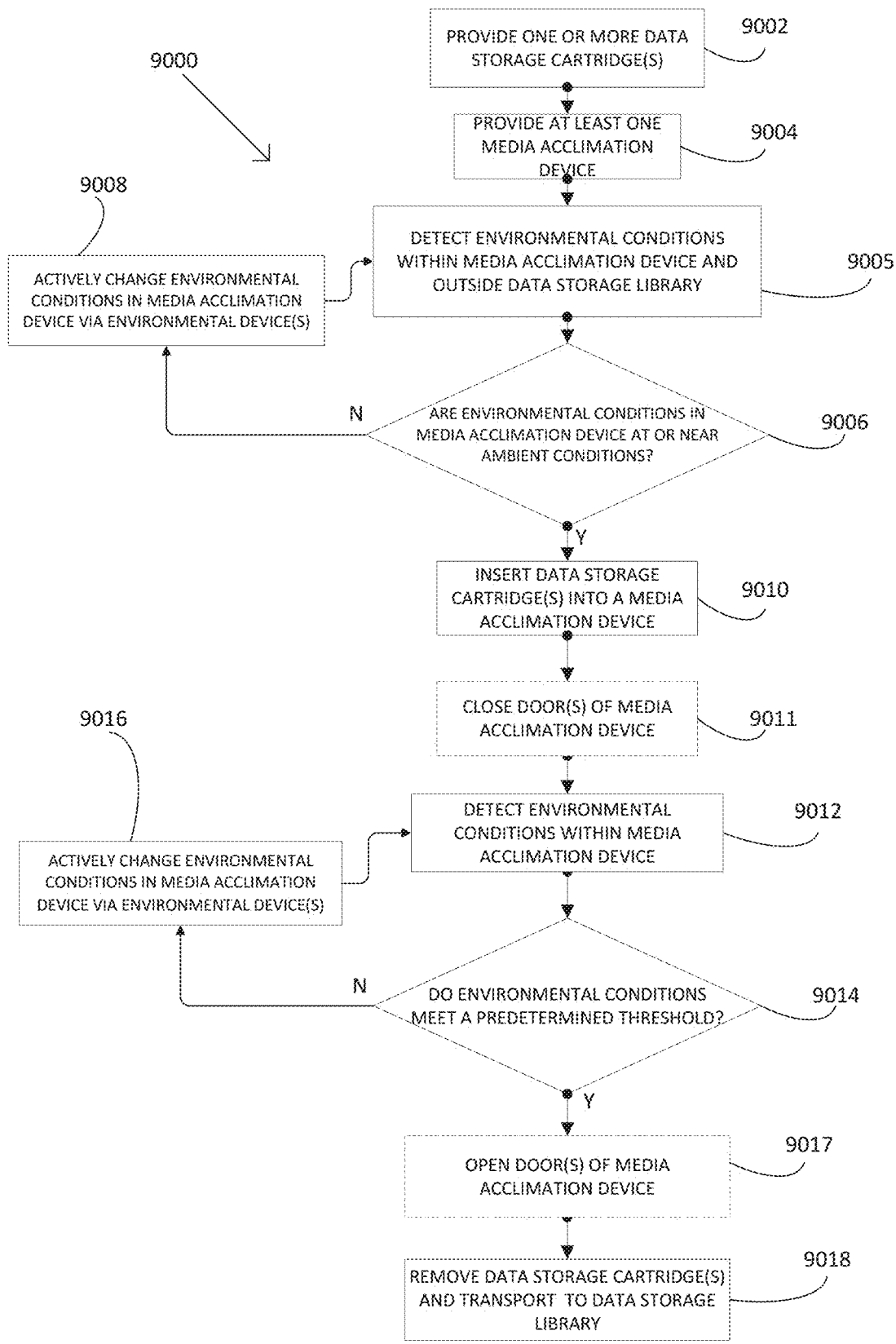
FIG. 19 is a flowchart of another embodiment of a method of acclimating at least one data storage cartridge.

Referring now to FIG. 19, media acclimation process 9000, for example, to acclimate a data storage cartridge from ambient conditions outside a data storage library to environmental conditions within the interior of a data storage library, is disclosed in accordance with another aspect of the present disclosure. While media acclimation process 9000 may be considered for the sake of convenience and not with an intent of limiting the disclosure as comprising a series and/or a number of steps, it is to be understood that the process does not need to be performed as a series of steps and/or the steps do not need to be performed in the order shown and described with respect to FIG. 19. At 9002, one or more data storage cartridges are provided, while at least one media acclimation device is provided at 9004. The at least one media acclimation device is preferably an active media acclimation device, such as, for example, one or more of the active media acclimation devices that is shown and described above with respect to FIGS. 11-15, although other active media acclimation devices are contemplated including media acclimation devices not disclosed herein capable of performing the process. Thus, the media acclimation device provided in 9004 is preferably acclimated via one or more active environmental control devices capable of changing the environmental conditions within the media acclimation device. At 9005, environmental conditions within the media acclimation device and outside the data storage library are detected and measured according to any of the methods described above. At 9006 it is determined whether or not the environmental conditions within the media acclimation device are at, near and/or within a range or threshold of the ambient environmental conditions outside the data storage library. This determining process can be performed according to any of the methods described above. If the environmental condition(s) within the media acclimation device do not meet the necessary requirements, which may be predetermined or calculated as part of the process (i.e., the process at 9006 is not met), then the environmental conditions within the media acclimation device are actively changed via the active environmental control device(s) so as to bring the environmental conditions therein to meet, or at least be near, or within a desired range and/or threshold of the ambient environmental conditions outside of the data storage library at 9008. Processes 9005, 9006 and 9008 may be repeated until yes, the desired environmental condition(s) in the media acclimation device are at, near and/or with a range or threshold of the environmental condition(s) outside the data storage library, and the one or more data storage cartridge(s) may be inserted into the media acclimation device at 9010.

Next, one or more doors of the media acclimation device may be closed at 9011 in order to insulate, separate, and/or isolate the interior of the media acclimation device. It is to be noted that in some embodiments, media acclimation device may not utilize doors or other physical barriers that require independent movement, and thus 9011 may be omitted. At 9012, the environmental conditions within the media acclimation device are then detected by, e.g., one or more environmental sensors associated with and/or within the media acclimation device. At 9014, it is determined whether or not the desired environmental condition(s) within the media acclimation device have met a threshold difference, which may be predetermined or calculated during and/or before the process, with the environmental condition(s) within the data storage library conditions. If no, the environmental conditions within the media acclimation device may be actively changed via the one or more active environmental control device so as to gradually ramp the environmental conditions toward the environmental conditions within the data storage library at 9016. The environmental conditions in the media acclimation device may be actively changed by utilizing an environmental conditioning unit associated with the data storage library, one or more environmental control devices as disclosed above, and/or utilizing one of the other manners disclosed in this application. Processes 9012, 9014 and 9016 may be repeated until yes, the environmental conditions within the media acclimation device are at, near, and/or with a range or threshold of the environmental condition(s) within the data storage library, and the data storage cartridge(s) have been acclimated. If the media acclimation device comprises one or more doors or other physical barriers that require independent movement, the door(s) may be opened at 9017, and the data storage cartridges may be removed from the media acclimation device and transported to the appropriate location within the data storage library at 9018.

Figure 20:
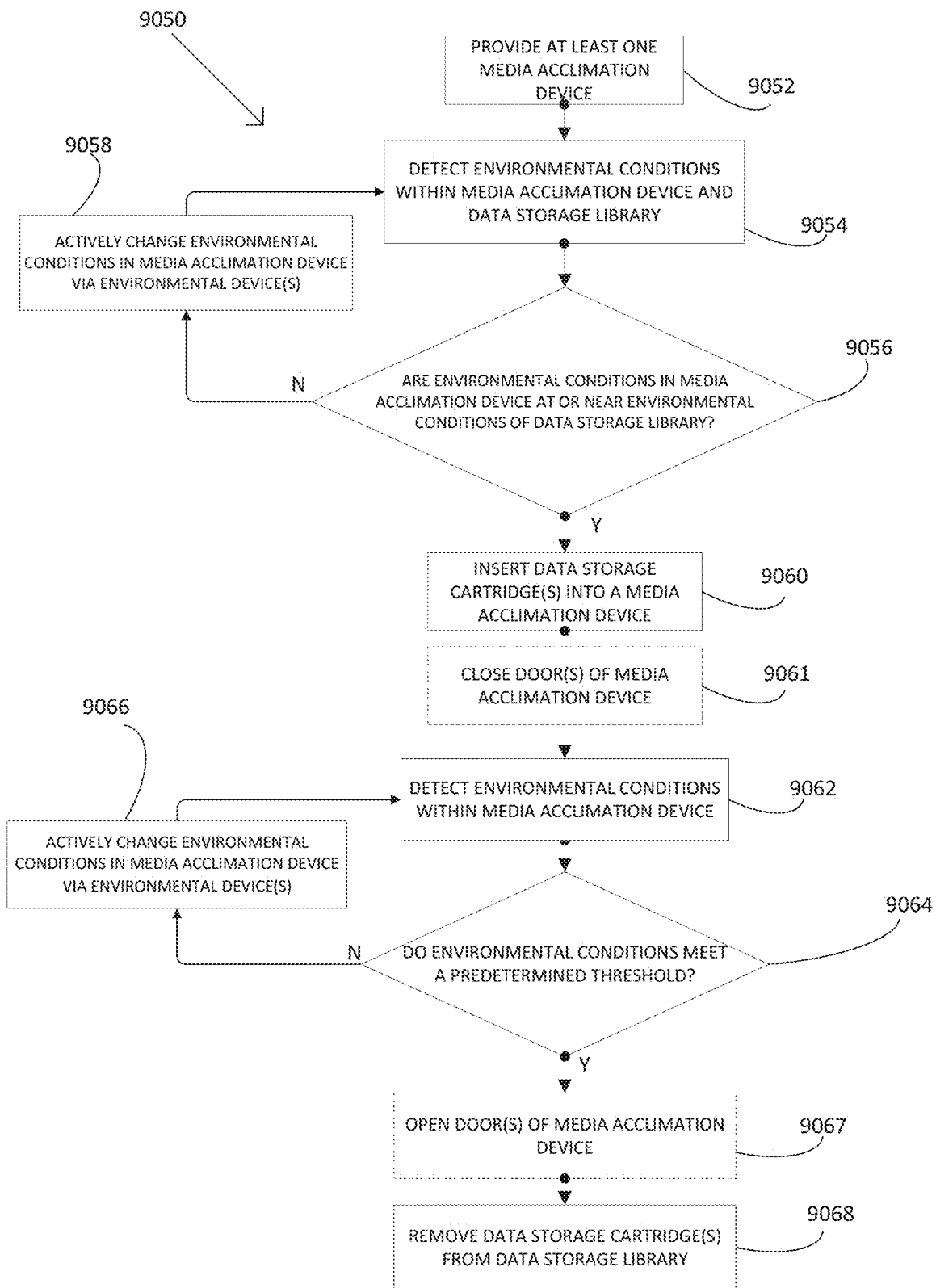
FIG. 20 is a flowchart of another embodiment of a method of acclimating at least one data storage cartridge.

Referring to FIG. 20, a media acclimation process 9050 similar to process 9000 described above with respect to FIG. 17 is disclosed, but with process 9050 describing the process for removing data storage cartridge(s) from a data storage library. While media acclimation process 9050 may be considered for the sake of convenience and not with an intent of limiting the disclosure as comprising a series and/or a number of steps, it is to be understood that the process does not need to be performed as a series of steps and/or the steps do not need to be performed in the order shown and described with respect to FIG. 20. At 9052, at least one media acclimation device is provided. Again, the at least one media acclimation device is preferably an active media acclimation device, such as, for example, one or more of the active embodiments that is shown and described above with respect to FIGS. 11-15, although other media acclimation devices are contemplated. Thus, the media acclimation device provided in 9052 is preferably acclimated via one or more active environmental control devices capable of changing the environmental conditions within the media acclimation device. At 9054, environmental conditions within the media acclimation device and inside the data storage library are detected and measured according to any of the methods described above. At 9056, it is determined whether or not the environmental conditions within the media acclimation device are at, near, and/or within a desired range or threshold of the ambient environmental conditions within the data storage library. This determining process can be performed according to any of the methods described above. If the environmental condition(s) within the media acclimation device do not meet the necessary requirements (the process at 9056 is not met), which requirements may be predetermined or calculated as part of the process, then the environmental conditions within the media acclimation device are actively changed via the active environmental control device(s) so as to bring the environmental conditions therein to, near and/or within a desired range or threshold of the environmental conditions within the data storage library at 9058. Processes 9054, 9056 and 9058 may be repeated until yes, the desired environmental condition(s) in the media acclimation device are at, near and/or with a range or threshold of the environmental condition(s) inside the data storage library, and in response thereto, one or more data storage cartridge(s) may be inserted into the media acclimation device at 9060, which begins the acclimation of the one or more data storage cartridge(s).

Next, one or more doors of the media acclimation device may be closed at 9061 in order to insulate, separate, and/or isolate the interior of the media acclimation device. It is to be noted that in some embodiments, media acclimation device may not utilize doors or other physical barriers that require independent movement, and thus 9061 may be omitted. At 9062, the environmental conditions within the media acclimation device and outside the data storage library are then detected by, e.g., one or more environmental sensors. At 9064, it is determined whether or not the environmental conditions within the media acclimation device or at, near, and/or within a desired range or threshold of the ambient environmental conditions outside of the data storage library. If no, the environmental conditions within the media acclimation device may be actively changed via the one or more environmental control devices so as to gradually ramp the environmental conditions toward the environmental conditions outside of the data storage library at 9066. Processes 9062, 9064, and 9066 are repeated until yes, the environmental conditions within the media acclimation device meet the requirements or criteria specified, calculated or otherwise determined. If media acclimation device comprises one or more doors or other physical barriers that require independent movement, the door(s) may be opened at 9067, and then the data storage cartridge(s) may be removed from the media acclimation device for removal from the data storage library at 9068.

In a number of the processes described above, a determination is made as to whether or not the one or more environmental conditions within the media acclimation device is at, near, within a range of and/or within a threshold of the one or more environmental conditions of the interior and/or exterior of the data storage library. The amount by which the conditions inside the media acclimation device are near, within a range, and/or within a threshold of the conditions inside and/or outside the data storage library may be predetermined and set during programming, delivery or set and/or reset during use and may be based upon environmental conditions of the location and facility where the data storage library will be operated, and the internal environmental conditions the library will be exposed to during operation. The numbers and/or values (e.g., how near, the range and/or threshold difference) may be set in memory and/or placed in a look up table based upon the anticipated conditions of use. Alternatively, the numbers and/or values for how near, the range, and/or threshold differences can be based upon calculations performed in real time based upon the conditions of use, and/or look up tables may be programmed and which provide the numbers and values for how near, the range and/or threshold differences based upon real time measurements of the environmental conditions in the respective areas (acclimation device, interior and exterior of the data storage library) and the process being undertaken.

It follows that various embodiments described and/or suggested herein are able to provide data storage systems, more specifically, automated tape libraries having climate control capabilities, with at least one media acclimation device. As a result, favorable conditions (e.g., temperature, humidity, presence of contaminants, etc.) may be maintained for the tape drives and/or media which may be stored in the library, while condensation accumulation on the media (and its subsequent effect on contacting devices) may be inhibited and/or avoided. Moreover, a data storage library may be maintained at an appropriate temperature, humidity, contaminant level, etc. regardless of whether the library is installed in an unfavorable (e.g., hot and/or wet) data center location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, an SD (Secure Digital) Card, a Micro SD Card, a CompactFlash Card, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, such as a library controller, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Some blocks may be combined and some may be removed. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage library for the handling of a plurality of data storage cartridges, the data storage library comprising:
   at least one library frame enclosure, the at least one library frame enclosure configured to receive one or more data storage cartridges;
   at least one environmental conditioning unit for conditioning the internal environment conditions within the interior of the at least one library frame enclosure to be different than the environmental conditions exterior of the at least one library frame enclosure; and
   at least one media acclimation device having an interior comprising one or more storage locations to receive the one or more data storage cartridges therein, and further wherein the at least one media acclimation device is configured to gradually acclimate the one or more storage locations from one or more external environmental conditions to one or more internal environmental conditions,
   wherein the data storage library is configured to:
   determine if the at least one environmental condition within the interior of the at least one media acclimation device meets a predetermined threshold; and remove the data storage cartridge from the at least one media acclimation device in response to the at least one condition within the interior of the at least one media acclimation device meeting the predetermined threshold.

2. The data storage library of claim 1, wherein the at least one media acclimation device has associated therewith at least one of a thermoelectric heater, a thermoelectric cooler, an electric heater, a liquid heater, a liquid cooler, an air conditioner, a heat pump, an evaporative cooler, an ionizer, a deionizer, a humidifier, a dehumidifier, one or more fans, or any combination thereof to gradually acclimate the interior of the at least one media acclimation device.

3. The data storage library of claim 1, further comprising one or more import/export (I/O) stations, wherein at least a portion of the one or more I/O stations is configured to act as the at least one media acclimation device.

4. The data storage library of claim 3, wherein the one or more I/O stations comprise at least a first environmental barrier in communication with the exterior of the at least one library frame enclosure and at least a second environmental barrier in communication with the interior of the at least one library frame enclosure, wherein the first and second environmental barriers are configured to selectively provide a separate environment within the one or more I/O stations.

5. The data storage library of claim 4, wherein the first environmental barrier comprises a moveable door of the one or more I/O stations, and wherein the moveable door is manually operable by a user for insertion of the at least one data storage cartridge.

6. The data storage library of claim 3, wherein the one or more I/O stations are associated with one or more fans, wherein the one or more fans are configured to selectively provide airflow between the I/O station and the interior environment of the library frame enclosure and/or between the I/O station and the exterior environment of the library frame enclosure.

7. The data storage library of claim 1 further comprising one or more data storage drive bays, wherein at least a portion of the one or more data storage drive bays is configured to act as the at least one media acclimation device.

8. The data storage library of claim 7, wherein the at least one media acclimation device comprises at least one opening configured to provide access for insertion and/or removal of at least one data storage cartridge therein.

9. The data storage library of claim 7, wherein the at least one media acclimation device comprises at least one air duct having a first end in communication with an internal cavity of the at least one media acclimation device and a second end in communication with at least one environmental control device.

10. The data storage library of claim 7, wherein the at least one library frame comprises one or more data storage drive bays for receiving one or more data storage drives, the data storage drive bays having one or more power connectors configured to provide power to the one or more data storage drives, wherein the library media acclimation device is configured to be couplable to the power connector for the data storage drives.

11. The data storage library of claim 7, wherein the at least one media acclimation device comprises at least one liquid supply line having a first end in communication with the interior of the at least one media acclimation device and a second end in communication with at least one environmental control device.

12. The data storage library of claim 7, wherein the media acclimation device has an opening to receive the data storage cartridges and wherein the opening comprises an environmental barrier.

13. The data storage library of claim 1, further comprising a robotic accessor for accessing and transporting one or more data storage cartridges, wherein the at least one media acclimation device is associated with the robotic accessor.

14. The data storage library of claim 1, further comprising at least one environmental sensor within the at least one library frame enclosure, at least one environmental sensor external to the at least one library frame enclosure, and at least one environmental sensor within the at least one media acclimation device.

15. The data storage library of claim 14, wherein each of the at least one environmental sensors comprise at least one of a temperature sensor and a humidity sensor.

16. The data storage library of claim 1, wherein the one or more storage locations consists of at least one from the group of storage slot cells, deep storage slot cells, a removable magazine and combinations thereof, and wherein the one or more storage locations is configured to act as the at least one media acclimation device.

17. The method of claim 1, wherein the environmental conditions within the interior of the at least one library frame enclosure, exterior of the at least one library frame enclosure, and within the interior of the at least one media acclimation device are chosen from a group consisting of at least one of temperature and humidity.

18. A data storage library for the handling of a plurality of data storage cartridges, the data storage library comprising:
at least one library frame enclosure, the at least one library frame enclosure configured to receive one or more data storage cartridges;
at least one environmental conditioning unit for conditioning the internal environment conditions within the interior of the at least one library frame enclosure to be different than the environmental conditions exterior of the at least one library frame enclosure; and
at least one media acclimation device comprising one or more storage locations to receive the one or more data storage cartridges therein, and further wherein the at least one media acclimation device is configured to gradually acclimate the one or more storage locations from one or more external environmental conditions to one or more internal environmental conditions,
wherein the data storage system is configured to:
monitor at least one environmental condition within the media acclimation device;
monitor at least one environmental condition outside the media acclimation device;
adjust the at least one environmental condition within the media acclimation device based on the at least one environmental condition outside the media acclimation device; and
determine whether the at least one environmental condition within the media acclimation device meets a predetermined threshold; and removing the data storage cartridge from the at least one media acclimation device when it is determined that the at least one condition within the at least one media acclimation device meets the predetermined threshold.

19. The data storage system of claim 18, further configured so that a robotic accessor removes at least one data storage cartridge stored within the media acclimation device in response to the at least one environmental condition within the media acclimation device meeting the predetermined threshold.

\* \* \* \* \*